(12) United States Patent
Asthana et al.

(10) Patent No.: US 7,487,204 B2
(45) Date of Patent: Feb. 3, 2009

(54) SYSTEM AND METHOD FOR ACCESSING INFORMATION PROCESSOR SERVICES FROM A MOBILE COMMUNICATION DEVICE

(75) Inventors: Atul Asthana, Unionville (CA); Gary P. Mousseau, Waterloo (CA); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1144 days.

(21) Appl. No.: 10/480,979

(22) PCT Filed: Jun. 18, 2002

(86) PCT No.: PCT/CA02/00917

§ 371 (c)(1),
(2), (4) Date: Dec. 15, 2003

(87) PCT Pub. No.: WO02/103967

PCT Pub. Date: Dec. 27, 2002

(65) Prior Publication Data

US 2004/0185877 A1    Sep. 23, 2004

Related U.S. Application Data

(60) Provisional application No. 60/298,983, filed on Jun. 18, 2001.

(51) Int. Cl.
*G06F 13/00* (2006.01)
(52) U.S. Cl. .................................... 709/203
(58) Field of Classification Search ................. 709/203
See application file for complete search history.

(56) References Cited

U.S. PATENT DOCUMENTS 6,169,897 B1 * 1/2001 Kariya ..................... 455/456.3

FOREIGN PATENT DOCUMENTS

EP     0855821 A1    7/1998

OTHER PUBLICATIONS

Webber, et al.: "Understanding ebXML, UDDI, XML/EDI," XML Global, Oct. 2000, http://www.xml.org/feature_articles/2000_1107_miller.shtml, (7 pages).
EPO: Extended European Search Report (Communication dated Nov. 19, 2007) for European Patent Application No. 06009686.4-1244 (6 pages).

* cited by examiner

*Primary Examiner*—Robert B Harrell
(74) *Attorney, Agent, or Firm*—Jones Day; Krishna K. Pathiyal; Robert C. Liang

(57) ABSTRACT

A system and method for pushing information from a host system to a mobile data communication device upon sensing a triggering event is disclosed. A redirector program operating at the host system enables a user to continuously redirect user-selected data items from the host system to the user's mobile data communication device upon detecting that one or more user-defined triggering events has occurred. The redirector program operates in connection with event generating applications and repackaging systems at the host system to configure and detect particular user-defined events, and then to repackage the user-selected data items in an electronic wrapper prior to pushing the data items to the mobile device. The system includes information processing components for identifying one or more information processors in the vicinity of the mobile device and then routing an attachment or information from the host system, the device or an external information source to a selected information processor.

67 Claims, 20 Drawing Sheets

SYSTEM AND METHOD FOR ACCESSING INFORMATION PROCESSOR SERVICES FROM A MOBILE COMMUNICATION DEVICE

CROSS-REFERENCE TO RELATED APPLICATIONS

This application claims priority from U.S. Provisional Patent Application Ser. No. 60/298,983, titled "System and Method for Managing Message Attachment and Information Processing from a Mobile Data Communication Device", filed on Jun. 18, 2001. This application is related to U.S. patent application Ser. No. 09/761,480, filed on Jan. 16, 2001 and issued on Aug. 20, 2002 as U.S. Pat. No. 6,438,585, which is a continuation-in-part of U.S. patent application Ser. No. 09/087,632, filed on May 29, 1998 and issued on Apr. 17, 2001 as U.S. Pat. No. 6,219,694, and U.S. patent application Ser. No. 09/545,963, filed on Apr. 10, 2000 and issued on Aug. 17, 2004 as U.S. Pat. No. 6,779,019. This application is also related to the following co-pending, and commonly-owned, United States patent applications, all of which are related to Ser. No. 09/087,632, U.S. patent application Ser. No. 09/401,868, issued on Mar. 2, 2004 as U.S. Pat. No. 6,701,378, Ser. No. 09/528,495, issued on Oct. 8, 2002 as U.S. Pat. No. 6,463,464, Ser. No. 09/545,962, issued on Apr. 24, 2007 as U.S. Pat. No. 7,209,955, and Ser. No. 09/649,755, issued on Oct. 8, 2002 as U.S. Pat. No. 6,463,463, all of which are hereby incorporated into the present application by reference.

BACKGROUND

1. Field of the Invention

The present invention is directed generally toward the field of mobile communications, and in particular to managing the processing of message attachments and other information from a mobile data communication device.

A further aspect of the invention provides a system and method for sending message attachments or other information from the mobile data communication device to one or more processing devices. Systems and methods according to this aspect of the invention are particularly useful for mobile devices, such as pagers, PDAs, cellular telephones, etc., that have limited memory capacity and thus may have difficulty processing attachment files.

2. Description of the Related Art

Present systems and methods for replicating (or redirecting) information from a host system to a user's mobile data communication device are typically "synchronization" systems in which the user's data items are warehoused (or stored) at the host system for an indefinite period of time and then transmitted in bulk to the mobile device only in response to a user request. In these types of systems and methods, when replication of the warehoused data items to the mobile device is desired, the user typically places the mobile device in an interface cradle that is electrically connected to the host system via some form of local, dedicated communication. Software executing on the mobile device then transmits commands via the local communications link to the host system to cause the host to begin transmitting the user's data items for storage in a memory bank of the mobile device.

In these known synchronization schemes, the mobile unit "pulls" the warehoused information from the host system in a batch each time the user desires to replicate information between the two devices. Therefore, the two systems (host and mobile) only maintain the same data items after a user-initiated command sequence that causes the mobile device to download the data items from the host system. A general problem with these synchronization systems is that the only time that the user data items are replicated between the host system and the mobile data communication device is when the user commands the mobile device to download or pull the user data from the host system. Five minutes later a new message could be sent to the user, but the user would not receive that message until the next time the user fetches the user data items. Thus, a user may fail to respond to an emergency update or message because the user only periodically synchronizes the system, such as once per day. Other problems with these systems include: (1) the amount of data to be reconciled between the host and the mobile device can become large if the user does not "synchronize" on a daily or hourly basis, leading to bandwidth difficulties, particularly when the mobile device is communicating via a wireless packet-switched network; and (2) reconciling large amounts of data, as can accrue in these batch-mode synchronization systems, can require a great deal of communication between the host and the mobile device, thus leading to a more complex, costly and energy-inefficient system.

A more automated, continuous, efficient and reliable system of ensuring that user data items are replicated at the user's mobile device is therefore needed.

There remains an additional need for such a system and method that provides flexibility in the types and quantities of user data items that are pushed from the host system to the mobile data communication device and that also provides flexibility in the configuration and types of events that can serve to trigger the redirection of the user data items.

There remains yet an additional need for such a system and method that can operate locally on a user's desktop PC or at a distance via a network server.

There remains still another need for such a system and method that provides for secure, transparent delivery of the user-selected data items from the host system to the mobile device.

There remains an additional need for such a system and method in which the user is provided with a flexible means of processing message attachments that may be too large or incompatible with the configuration of the mobile device.

SUMMARY

A system and method of pushing user-selected data items from a host system to a user's mobile data communication device upon detecting the occurrence of one or more user-defined event triggers is provided. As used in this application, the term host system refers to the computer where the redirector software is operating. In one embodiment, the host system is a user's desktop PC, although, alternatively, the host system could be a network server connected to the user's PC via a local-area network ("LAN"), or could be any other system that is in communication with the user's desktop PC.

A redirector program operating at the host system enables the user to redirect or mirror certain user-selected data items (or parts of data items) from the host system to the user's mobile data communication device upon detecting that one or more user-defined triggering events has occurred. In this application, the terms "information," "data items," "messages," and "datagrams" are used interchangeably to mean an information object that is received at or sent from the host system or the mobile device. Also operating at the host system are various sub-systems that can be configured to create triggering events, such as a screen saver sub-system or a keyboard sub-system, as well as sub-systems for repackaging the user's data items for transparent delivery to the mobile data device, such as a TCP/IP sub-system or one or more E-Mail sub-systems. Other sub-systems for creating triggering events and repackaging the user's data items could also be present at the host system. The host system also includes a primary memory store where the user's data items are normally stored.

Using the redirector program, the user can select certain data items for redirection, such as E-mail messages, calendar events, meeting notifications, address entries, journal entries, personal reminders etc. Having selected the data items for redirection, the user can then configure one or more event triggers to be sensed by the redirector program to initiate redirection of the user data items. These user-defined trigger points (or event triggers) include external events, internal events and networked events. Examples of external events include: receiving a message from the user's mobile data communication device to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the examples of the types of user-defined events that can trigger the redirector program to push data items from the host to the mobile device. Although in a preferred embodiment it is anticipated that the configuration that specifies which data items will be redirected and in what form will be set at the host system, such configuration may be set or modified through data sent from the mobile communications device.

In addition to the functionality noted above, the redirector program provides a set of software-implemented control functions for determining the type of mobile data communication device and its address, for programming a preferred list of message types that are to be redirected, and for determining whether the mobile device can receive and process certain types of message attachments, such as word processor or voice attachments. The determination of whether a particular mobile device can receive and process attachments is preferably initially configured by the user of that mobile device at the host system. This configuration can be altered on a global, per message basis or per device basis by transmitting a command message from the mobile device to the host system. If the redirector is configured so that the mobile data device cannot receive and process word processor or voice attachments, then the redirector routes these attachments to an external machine that is compatible with the particular attachment, such as an attached printer or networked fax machine or telephone. Other types of attachments could be redirected to other types of external machines in a similar fashion, depending upon the capabilities of the mobile device. For example, if a user is traveling and receives a message with an attachment that the user's mobile device can process or display, the user may from a mobile communications device send a command message to the host system indicating that that attachment is to be sent to a fax machine at a hotel where the user will be spending the evening. This enables the user to receive important E-mail attachments as long as the host system is provided with sufficient information about the destination where the attachment is to be forwarded.

Once an event has triggered redirection of the user data items, the host system then repackages these items in a manner that is transparent to the mobile data communication device, so that information on the mobile device appears similar to information on the user's host system. The preferred repackaging method includes wrapping the user data items in an E-mail envelope that corresponds to the address of the mobile data communication device, although, alternatively, other repackaging methods could be used, such as special-purpose TCP/IP wrapping techniques, or other methods of wrapping the user selected data items. The repackaging preferably results in E-mail messages generated by the user from the mobile device to be transmitted from the host system, thus enabling the user to appear to have a single E-mail address, such that the recipients of messages sent from the mobile communications device do not know where the user was physically located when the message was first sent. The repackaging also permits both messages to the mobile device and sent from the mobile device to be encrypted and decrypted as well as compressed and decompressed.

In an alternative system and method, the redirector program executes on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' mobile data communication devices. In response to receiving one of these triggers, the server redirects the user's data items to the proper mobile data communication device. The user data items and addressing information for a particular mobile device can be stored at the server or at the user's PC. Using this alternative configuration, one redirector program can serve a plurality of users. This alternative configuration could also include an Internet- or intranet-based redirector program that could be accessible through a secure webpage or other user interface. The redirector program could be located on an Internet Service Provider's system and accessible only through the Internet.

In another alternative configuration, a redirector program operates at both the host system and at the user's mobile data communication device. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

An advantage of this system and method is that triggering of continuous and real-time redirection of user-selected data items from a host system to a mobile data communication device is provided. Other advantages include: (1) flexibility in defining the types of user data to redirect, and in defining a preferred list of message types that are to be redirected or preferred senders whose messages are to be redirected; (2) flexibility in configuring the system to respond to numerous internal, external and networked triggering events; (3) transparent repackaging of the user data items in a variety of ways such that the mobile data communication device appears as though it were the host system; (4) integration with other host system components such as E-mail, TCP/IP, keyboard, screen saver, webpages and certain programs that can either create user data items or be configured to provide trigger points; (5) the ability to operate locally on a user's desktop system or at a distance via a network server; (6) the ability to receive, process, and manage attachment redirection; (7) the ability to dynamically change and dynamically re-route attachment redirection; and (8) management of data item attachments and other information processing from a mobile communication device.

A method of controlling an information processor using a mobile communication device is provided. The method may include the steps of obtaining service information, including at least one service address associated with a service provided by the information processor, from a service information provider, sending a communication signal from the mobile communication device to the information processor using the service address, receiving the communication signal at the information processor, and performing an information processing operation in response to the communication signal.

A system for accessing services of an information processor with a mobile communication device is also provided, and may comprise a service information provider located remotely from the information processor and the mobile communication device, wherein the service information provider includes service information comprising one or more service addresses associated with the information processor, and an interface between the service information provider and the mobile communication device for transferring the service information associated with the information processor to the mobile communication device. The mobile communication device obtains the service information associated with the information processor via the interface, and each service address enables the mobile communication device to access a particular service of the information processor.

These are just a few of the many advantages of the systems and methods described in more detail below. As will be appreciated, each system and method is capable of other and different embodiments, and its several details are capable of modifications in various respects. Accordingly, the drawings and description of preferred embodiments set forth below are to be regarded as illustrative in nature and not restrictive.

DETAILED DESCRIPTION OF THE DRAWINGS

Figure 1:
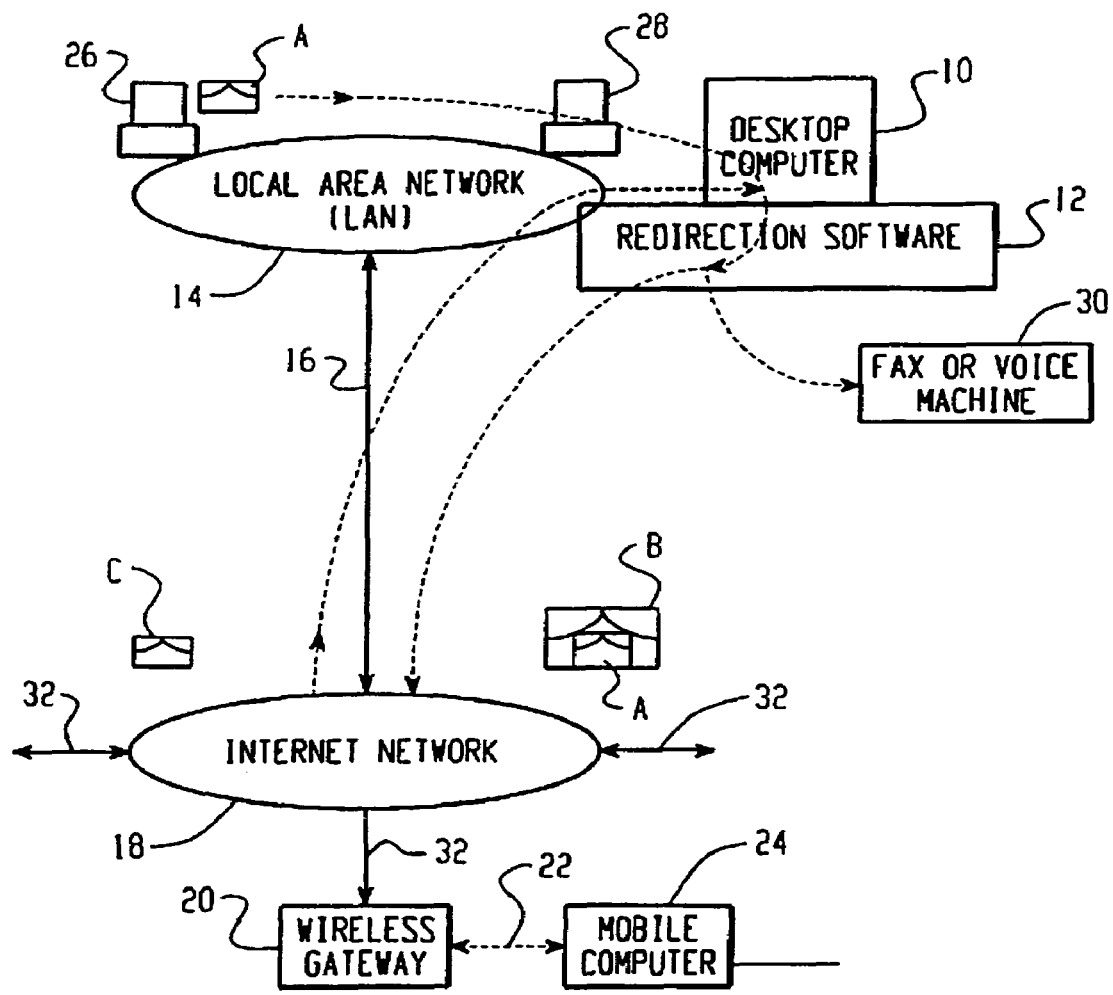
FIG. 1 is a system diagram showing the redirection of user data items from a user's desktop PC (host system) to the user's mobile data communication device, where the redirector software is operating at the user's desktop PC.

Referring now to the drawings, FIG. 1 is an example system diagram showing the redirection of user data items (such as message A or C) from a user's office PC (host system) 10 to the user's mobile data communication device 24, where the redirector software (program) 12 is operating at the user's PC. Message A in FIG. 1 represents an internal message sent from desktop 26 to the user's host system 10 via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video), a cellular phone, or a machine capable of processing and playing audio files, such as a voice mail system. Machine 30 is also referred to herein as an attachment displayer. This system also includes the ability to redirect certain message attachments to such an external machine 30 if the redirector program configuration data reflects that the mobile device 24 cannot receive and process the attachments, or if the user has specified that certain attachments are not to be forwarded to mobile device 24, even if such device can process those attachments.

For example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the Internet and to send the audio clip to the user's voice mail system. This example is not intended to limit the breadth and scope of redirection, but rather to illustrate the variety of possibilities embodied in the redirection concept. The attachment redirection capabilities, as well as processing management attachment or information processing are further described below with reference to FIGS. 6-8.

Figure 4:
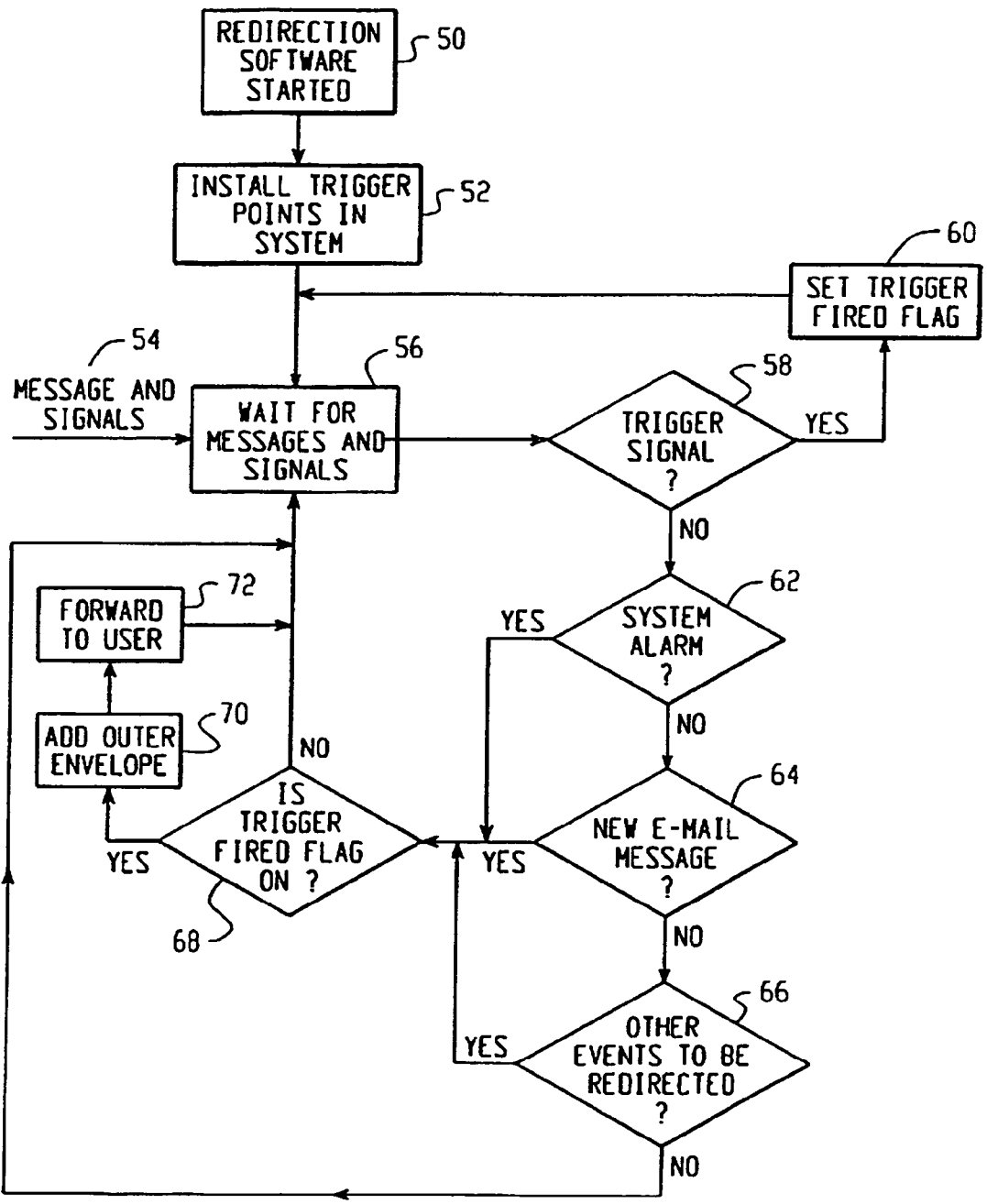
FIG. 4 is a flow chart showing the steps carried out by the redirector software operating at the host system.

The mobile data communication device 24 is preferably a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the system could be beneficially used in a "one and one-half" or acknowledgment paging environment, or even with a one-way paging system. The mobile data communication device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

Figure 10:
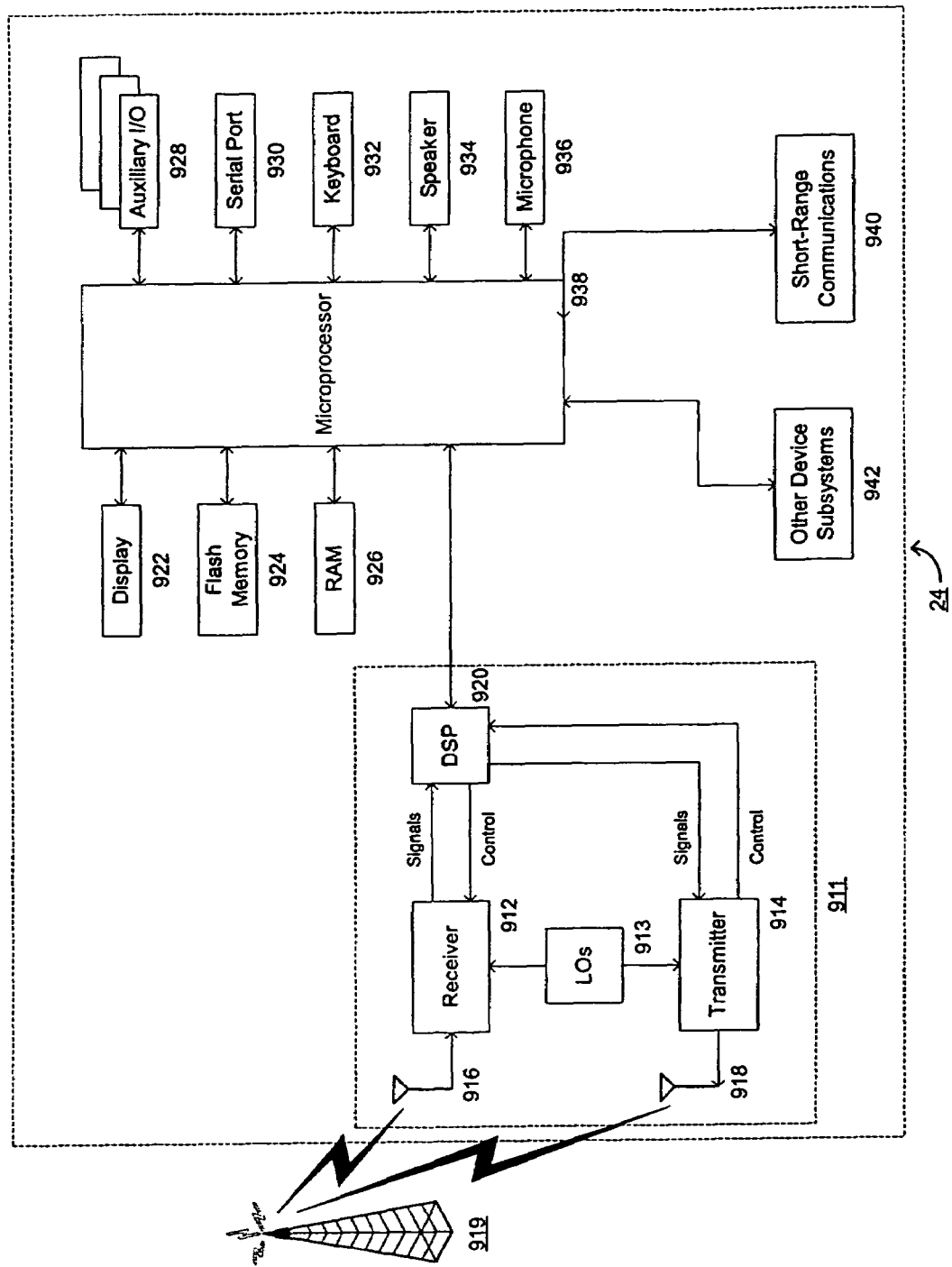
FIG. 10 is an illustrative block diagram of a preferred mobile communication device in which the systems and methods described herein may be implemented.

FIG. 10 is an illustrative block diagram of a preferred mobile communication device 24 in which the systems and methods described herein may be implemented. The mobile communication device 24 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 24 is enabled for two-way communications, the device will incorporate a communication subsystem 911, including a receiver 912, a transmitter 914, and associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, a device 24 destined for a North American market may include a communication subsystem 911 designed to operate within the Mobitex™ mobile communication system or DataTAC™ mobile communication system, whereas a device 24 intended for use in Europe may incorporate a General Packet Radio Service (GPRS) communication subsystem 911.

Network access requirements will also vary depending upon the type of network 919. For example, in the Mobitex and DataTAC networks, mobile devices such as 24 are registered on the network using a unique identification number or associated with each device. In GPRS networks however, network access is associated with a subscriber or user of a device 24. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the device 24 will be unable to carry out any functions involving communications over network 919. When required network registration or activation procedures have been completed, a device 24 may send and receive communication signals over the network 919. Signals received by the antenna 916 through a communication network 919 are input to the receiver 912, which may perform such common receiver functions as signal amplification, frequency down conversion, filtering, channel selection and the like, and in the example system shown in FIG. 10, analog to digital conversion. Analog to digital conversion of a received signal allows more complex communication functions such as demodulation and decoding to be performed in the DSP 920. In a similar manner, signals to be transmitted are processed, including modulation and encoding for example, by the DSP 920 and input to the transmitter 914 for digital to analog conversion, frequency up conversion, filtering, amplification and transmission over the communication network 919 via the antenna 918.

The DSP 920 not only processes communication signals, but also provides for receiver and transmitter control. For example, the gains applied to communication signals in the receiver 912 and transmitter 914 may be adaptively controlled through automatic gain control algorithms implemented in the DSP 920.

The device 24 preferably includes a microprocessor 938 which controls the overall operation of the device. Communication functions, including at least data and voice communications, are performed through the communication subsystem 911. The microprocessor 938 also interacts with further device subsystems such as the display 922, flash memory 924, random access memory (RAM) 926, auxiliary input/output (10) subsystems 928, serial port 930, keyboard 932, speaker 934, microphone 936, a short-range communications subsystem 940 and any other device subsystems generally designated as 942.

Some of the subsystems shown in FIG. 10 perform communication-related functions, whereas other subsystems may provide "resident" or on-device functions. Notably, some subsystems, such as keyboard 932 and display 922 for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read only memory (ROM) or similar storage element (not shown). Those skilled in the art will appreciate that the operating system, specific device applications, or parts thereof, may be temporarily loaded into a volatile store such as RAM 926. It is contemplated that received communication signals may also be stored to RAM 926.

The microprocessor 938, in addition to its operating system functions, preferably enables execution of software applications on the device. A predetermined set of applications which control basic device operations, including at least data and voice communication applications for example, will normally be installed on the device 24 during manufacture. A preferred application that may be loaded onto the device may be a personal information manager (PIM) application having the ability to organize and manage data items relating to the device user such as, but not limited to e-mail, calendar events, voice mails, appointments, and task items. Naturally, one or more memory stores would be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system thereby creating a mirrored host computer on the mobile device with respect to the data items at least. This would be especially advantageous in the case where the host computer system is the mobile device user's office computer system. Further applications may also be loaded onto the device 24 through the network 919, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the device 24.

In a data communication mode, a received signal such as a text message or web page download will be processed by the communication subsystem 911 and input to the microprocessor 938, which will preferably further process the received signal for output to the display 922, or alternatively to an auxiliary I/O device 928. A user of device 24 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of the device 24 is substantially similar, except that received signals would preferably be output to a speaker 934 and signals for transmission would be generated by a microphone 936. Alternative voice or audio I/O subsystems such as a voice message recording subsystem may also be implemented on the device 24. Although voice or audio signal output is preferably accomplished primarily through the speaker 934, the display 922 may also be used to provide an indication of the identity of a calling party, the duration of a voice call, or other voice call related information for example.

The serial port 930 in FIG. 10 would normally be implemented in a personal digital assistant (PDA)-type communication device for which synchronization with a user's desktop computer (not shown) may be desirable, but is an optional device component. Such a port 930 would enable a user to set preferences through an external device or software application and would extend the capabilities of the device by providing for information or software downloads to the device 24 other than through a wireless communication network. The alternate download path may for example be used to load an encryption key onto the device through a direct and thus reliable and trusted connection to thereby enable secure device communication.

A short-range communications subsystem 940 is a further optional component which may provide for communication between the device 924 and different systems or devices, which need not necessarily be similar devices. For example, the subsystem 940 may include an infrared device and associated circuits and components or a Bluetooth™ communication module to provide for communication with similarly-enabled systems and devices. As described in further detail hereinbelow, such short-range communications components may be particularly useful in controlling processing of messages, message attachments and like information.

In an alternative embodiment, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1-9.

A user can configure the redirector program 12 to push certain user-selected data items to the user's mobile data communication device 24 when the redirector 12 detects that a particular user-defined event trigger (or trigger point) has taken place. When a secondary user-defined event trigger (or trigger point) occurs, which could be the same as the initial event trigger or could be a different event, the system may subsequently stop redirection. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10, or that the host system 10 acquires through the use of intelligent agents, such as data that is received after the host system 10 initiates a search of a database, a website, a bulletin board or other local or remote data store. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

User-defined event triggers that can be detected by the redirector program 12 in the preferred embodiment include external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. One preferred method of detecting new messages is using Microsoft's ® Messaging API (MAPI), in which programs, such as the redirector program 12, register for notifications or 'advise syncs' when changes to a mailbox take place. Other methods of detecting new messages could also be used.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message for redirection, the redirector program 12 could compress the original message A, could compress the message header, or could encrypt the entire message A to create a secure link to the mobile device 24.

Also programmed into the redirector 12 is the address of the user's mobile data communication device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30 or other type of attachment displayer.

The redirector may also be programmed with a preferred list mode that is configured by the user either at the host system 10, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can then send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the redirector software 12 then sends the message A to a secondary memory store located in the mobile device 24, using whatever means are necessary. In a preferred embodiment this method is to send the message A back over the LAN 14, WAN 18, and through the wireless gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. Repackaging and removing the outer envelope in this manner causes the mobile computer 24 to appear to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. The outgoing redirected message from the user's host system 10 is preferably sent using the E-mail address of the host mailbox, rather than the address of the mobile device, so that it appears to the recipient of the message that the message originated from the user's desktop system 10 rather than the mobile data communication device. Any replies to the redirected message will then be sent to the desktop system 10, which if it is still in redirector mode, will repackage the reply and re-send it to the user's mobile data device, as described above.

Figure 2:
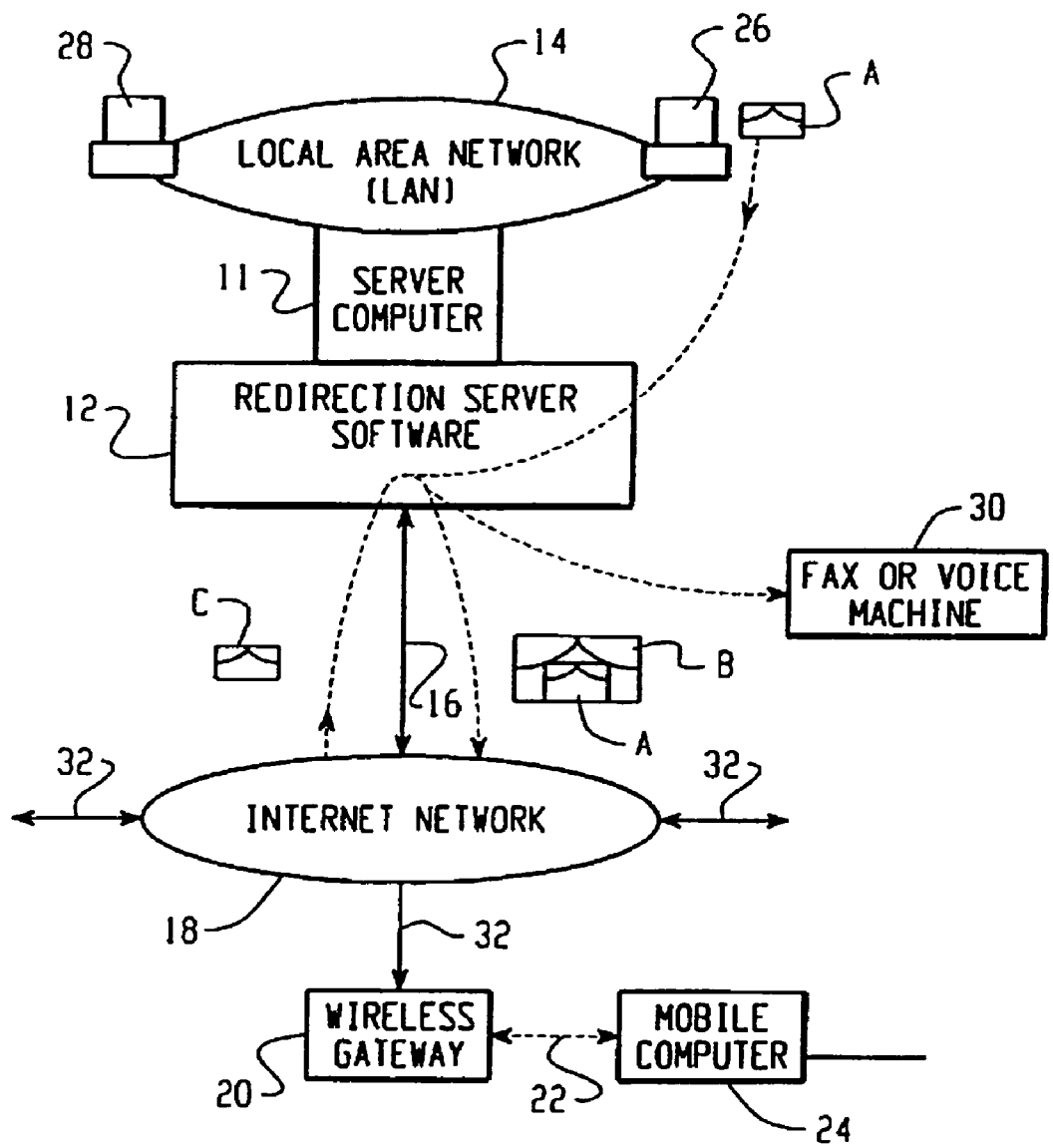
FIG. 2 is a system diagram showing the redirection of user data items from a network server (host system) to the user's mobile data communication device, where the redirector software is operating at the server.

FIG. 2 is an alternative system diagram showing the redirection of user data items from a network server 11 to the user's mobile data communication device 24, where the redirector software 12 is operating at the server 11. This configuration is particularly advantageous for use with message servers such as Microsoft's ® Exchange Server or Lotus Domino™ Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 26, 28, including information such as whether a particular user can have data items redirected, which types of message and information to redirect, how to process various types of message attachments, what events will trigger redirection, the address of the users' mobile data communication device 24, the type of mobile device, and the user's preferred list, if any. The event triggers are preferably detected at the user's desktop system 26, 28 and can be any of the external, internal or network events listed above. The desktop systems 26, 28 preferably detect these events and then transmit a message to the server computer 11 via LAN 14 to initiate redirection or to subsequently halt redirection. Although the user data items are preferably stored at the server computer 11 in this embodiment, they could, alternatively, be stored at each user's desktop system 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 28, but in this embodiment, user messages are stored at the network server 11. When an event occurs at desktop system 28, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 28.

As described above with reference to FIG. 1, message C could be either a command message from a user's mobile data communication device 24, or it could be a message from an external computer, such as a computer connected to the Internet 18. If the message C is from an Internet computer to the user's desktop system 28, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
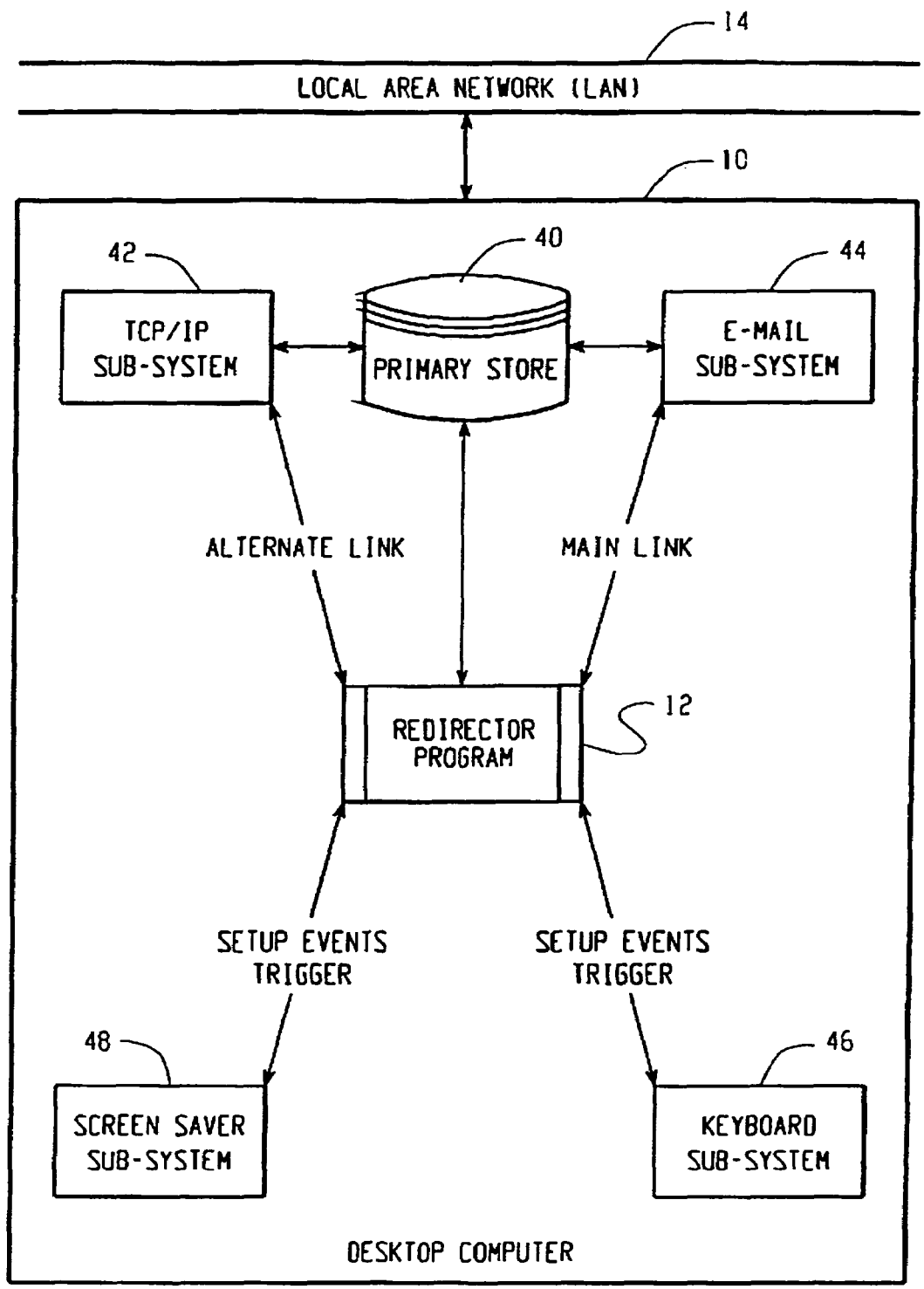
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12 with additional components of the host system 10 of FIG. 1 (the desktop PC) to enable more fully the pushing of information from the host system 10 to the user's mobile data communication device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve the transparency of the system, and the screen saver and keyboard subsystems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile data communication device, including the configuration of attachment handling and type recognition; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail subsystem 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10.

In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, redirection can be triggered to begin (or end) upon detecting numerous external, internal and networked events, or trigger points. Examples of external events include: receiving a command message from the user's mobile data communication device 24 to begin redirection;

receiving a similar message from some external computer; sensing that the user is no longer in the vicinity of the host system, such as by using the output of a digital camera, or by sensing the proximity of the user's mobile device using a wireless connection; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer (not the mobile device) that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start (or stop) the redirection process. For example, the screen saver system can be configured so that when the screen saver is activated, after, for example, 10 minutes of inactivity on the desktop system, an event trigger is transmitted to the redirector 12, which starts redirecting the previously selected user data items. When the screen saver becomes activated, for whatever reason, a second event trigger is generated in order to halt redirection. In a similar manner the keyboard sub-system can be configured to generate event triggers when no key has been depressed for a particular period of time, thus indicating that redirection should commence, and then to subsequently generate another trigger when a key is depressed to stop redirection. These are just two examples of the numerous application programs and hardware systems internal to the host system 10 that can be used to generate internal event triggers.

Figure 5:
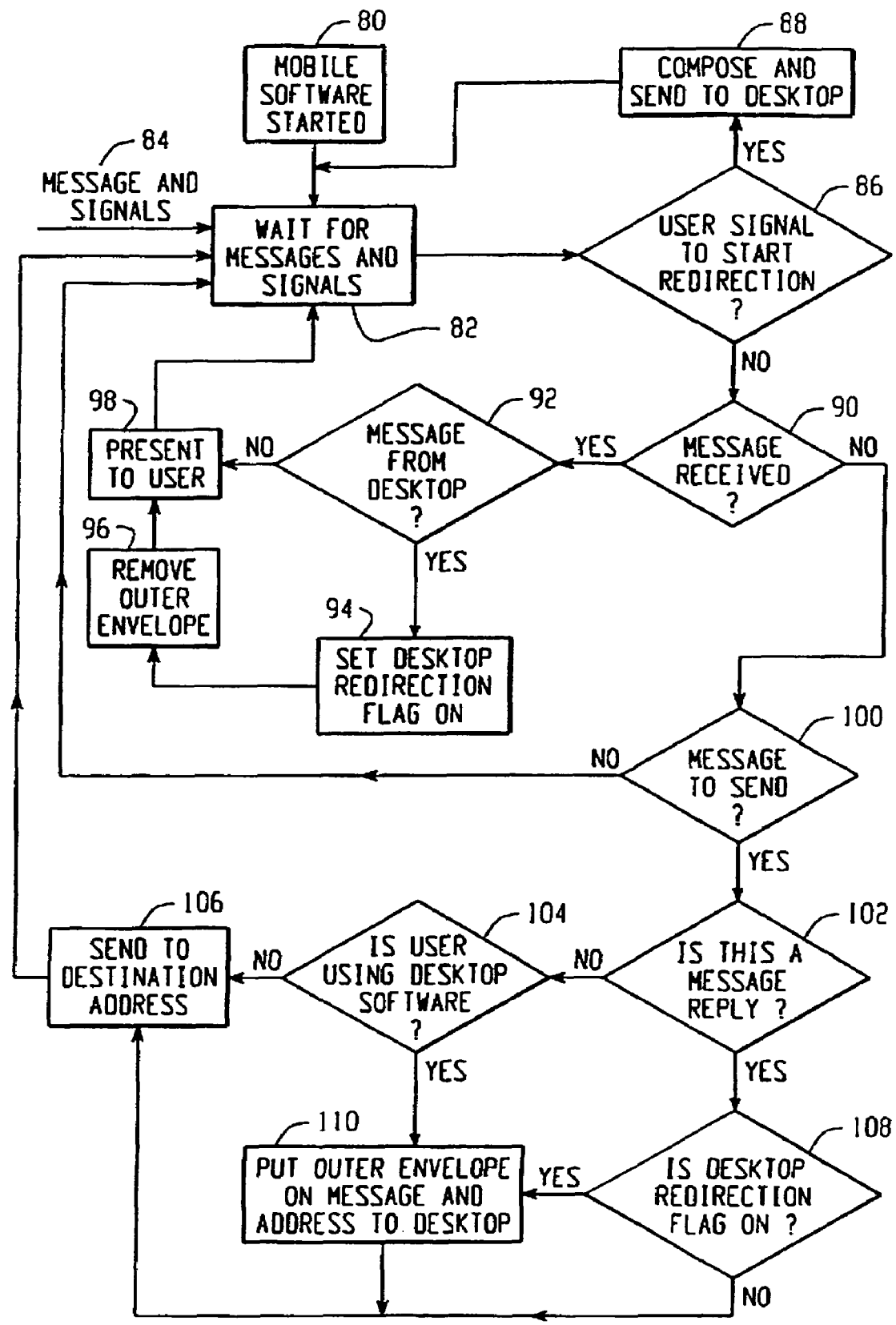
FIG. 5 is a flow chart showing the steps carried out by the mobile data communication device to interface with the redirector software operating at the host system.

FIGS. 4 and 5, set forth, respectively, flow charts showing the steps carried out by the redirector software 12 operating at the host system 10, and the steps carried out by the mobile data communication device 24 in order to interface with the host system. Turning first to FIG. 4, at step 50, the redirector program 12 is started and initially configured. The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device.

Once the redirector program is configured 50, the trigger points (or event triggers) are enabled at step 52. The program 12 then waits 56 for messages and signals 54 to begin the redirection process. A message could be an E-Mail message or some other user data item than may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag is set, then at step 70, the redirector 12 causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender was on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12. At step 80 the mobile software is started and the mobile device 24 is configured to operate with the system described above, including, for example, storing the address of the user's desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86 the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine 10. In this situation where the mobile device 24 is sending a message directly to the desktop system 10, no outer wrapper is added to the message (such as message C in FIGS. 1 and 2). In addition to the redirection signal, the mobile device 24 could transmit any number of other commands to control the operation of the host system, and in particular the redirector program 12.

For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is repackaged with the outer envelope having the addressing information of the user's desktop system 10, and the repackaged message is then transmitted to the desktop system 10 at step 106. As described above, the redirector program 12 executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If, however, the mobile determines that the user is using the redirector software 12 at the desktop system 10, then control passes to step 110, where the outer envelope is added to the message. The repackaged original message is then transmitted to the desktop system 10 at step 106, which, as described previously, strips the outer envelope and routes the message to the correct destination. Following transmission of the message at step 106, control of the mobile returns to step 82 and waits for additional messages or signals.

Figure 6:
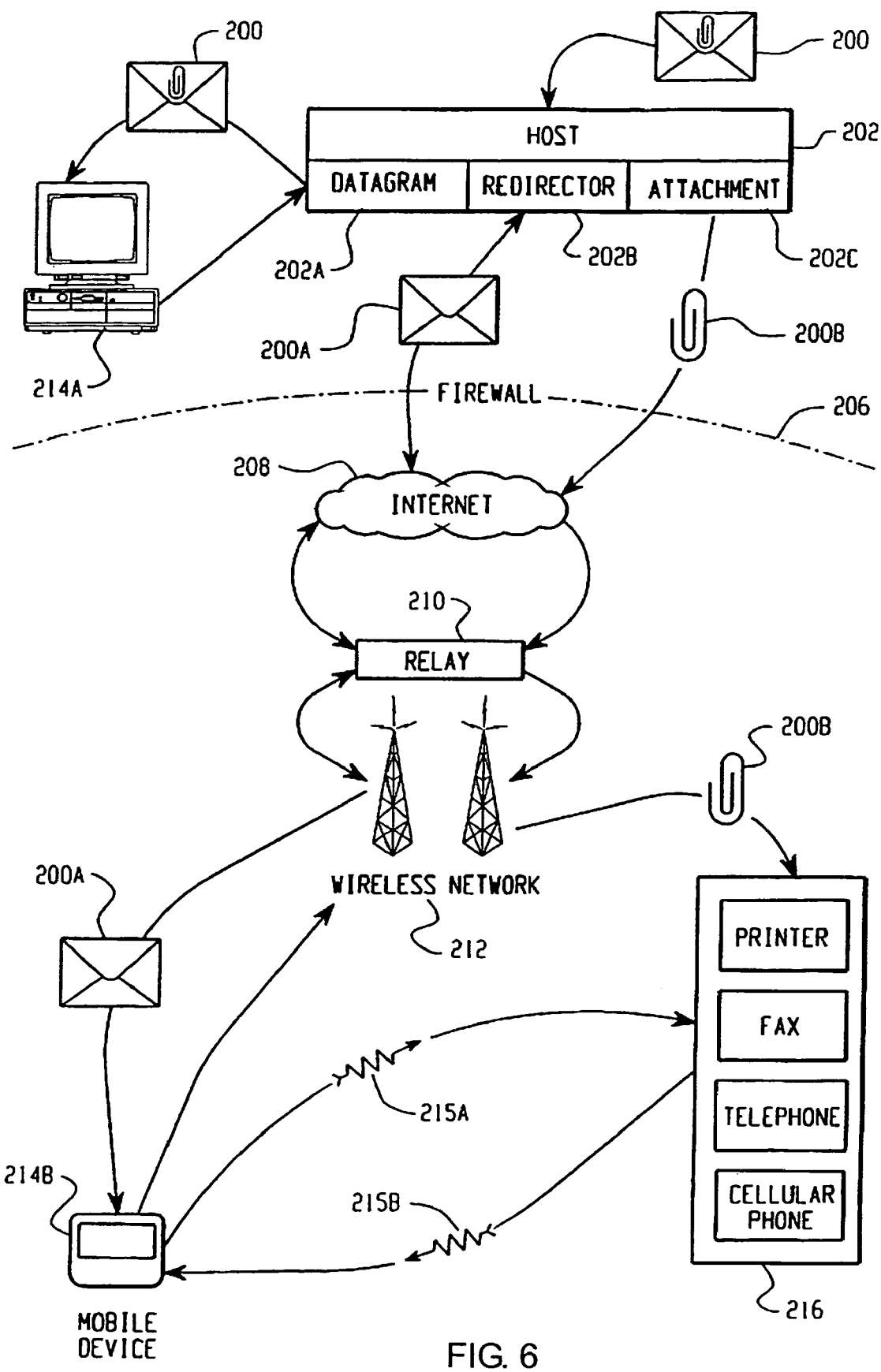
FIG. 6 sets forth a system for redirecting messages having attachments between a host system and a mobile device.

FIG. 6 sets forth a system for redirecting messages having attachments 200, preferably using the redirector program discussed above. This system preferably includes a desktop system 214A, which is associated with a mobile data communication device 214B, a host system 402, a relay system 410, and a plurality of attachment displayers 416. The host system includes a datagram component 202A, a redirector program 202B, and an attachment processing component 202C. The datagram component 202A is used to communicate datagrams 200 (i.e., messages or other types of information) between the host system 202 and the desktop system 214A. The host system 202 could be similar to the server 11 shown above in FIG. 2, in which case the host 202 and the desktop 214A would be coupled via a LAN. Alternatively, however, the host 202 could be remote from the desktop 214A, and could be coupled to it via a LAN, WAN, the Internet 208, a wireless network (not shown), a cableTV network, a satellite network, or any other type of communication medium. The redirector program 202B is similar to the redirector software described above. The attachment processing component 202C provides the functionality described below with reference to FIGS. 7-8.

The host system 202 is separated from any external networks by a firewall system 206. Firewall systems 206 are known in this field, and provide a security function for protecting an internal corporate network from any external networks. The firewall 206 is, in turn, connected to an external network 208, such as the Internet, which is in turn connected to a relay system 210 and then to the wireless network 212. As noted above, the wireless network 212 could be any type of digital or analog wireless communication network, such as a packet data network, a cellular network, a digital cellular network, a satellite network, a microwave network, etc.

The mobile data communication device 214B is configured to operate on the wireless network 212. In addition, the mobile data communication device 214B is preferably configured to operate on one or more short-range wireless frequencies in order to wirelessly communicate information 215A, 215B between the mobile device 214B and the attachment displayers 216. The mobile device 214B and the attachment displayers 216 could be Bluetooth-enabled devices for communicating at the short-range frequencies associated with the Bluetooth wireless standard. Other short-range wireless standards could also be utilized. The frequencies at which the short-range communication link operate could be RF, microwave, cellular, optical, or Infrared frequencies. The attachment displayers 216 are used by the mobile device 214B to process the attachment element 200B of the datagram 200, and may be one or more of the following devices: printers, fax machines, telephones, cellular phones, copying machines, video display, or any other type of device capable of processing an attachment.

In the system shown in FIG. 6, a datagram with an attached file 200 is sent to the host system 202. The host system 202 then sends the datagram with the attachment 200 intact to the desktop 204A of the recipient of the datagram 200 via the datagram component 202A. The datagram component 202A recognizes the recipient address in the datagram 200 and subsequently forwards the datagram 200 on to the desktop system 214A. The redirector component 202B of the host system 202B also sends the datagram 200A, stripped of the attachment 200B, through the host firewall 206 to the relay 210 and then on to the mobile device 214B via the Internet 208 and the wireless network 212. In a preferred embodiment, the attachment 200B is not initially redirected by the host system 202 when the datagram 200A is redirected. Alternatively, it is possible that automatic forwarding of attachments is possible; especially if the attachment is in a format that can be handled by the mobile device. The datagram 200A contains the original message and also contains information about the attachment 200B, such as the file name, size, and file type.

In a preferred embodiment, after the datagram 200A (minus the attachment 200B) is received at the mobile device 214B, the mobile device 214B will receive a command either from the host system 202 or from the user of the mobile device to find an attachment displayer 216 within its vicinity to process the attachment 200B. Alternatively, the mobile device 214B or user may automatically attempt to find an attachment displayer when the datagram 200A is received. Preferably through short range wireless communication 215A, 215B, the mobile device 214B will query 215A attachment displayers 216 in the local area of the mobile device 214B to determine whether they can process the attachment 200B. The attachment displayers 216 will then send back 215B to the mobile device 214B information pertaining to their location, electronic address, and the type of attachment files they can handle. The mobile device then processes this information regarding the attachment displayers 216, and sends the host system 202 an attachment displayer choice to use with the attachment 200B. The attachment component 202C of the host system receives the attachment displayer choice from the mobile device 214B, and will then send the attachment 200B to the chosen attachment displayer either through the wireless network 212, directly through the Internet 208, via a LAN connection, via a telephone or cellular connection, or via any other type of connection as specified by the information provided from the chosen attachment displayer 216.

In an alternative embodiment of this system, the attachment component 202C of the host system 202 would contain a database of attachment displayers 216 to which it sends attachments 200B by default depending on the file type. This database would include such information as displayer location, compatibility, and security. In this embodiment of the system, the mobile device does not chose the attachment displayer 216 in real-time, although the user may configure the system in advance to use a particular attachment displayer 216 contained in the database. Alternatively, the host system 202 may prompt the user of the mobile device 214B to select from a list of potential attachment displayers 216, or the host may actively determine the location of the mobile device 214B, and then present a list of potential attachment displayers 216 for selection by the user based upon positioning information of the mobile device in relation to the potential attachment displayers 216.

Figure 7:
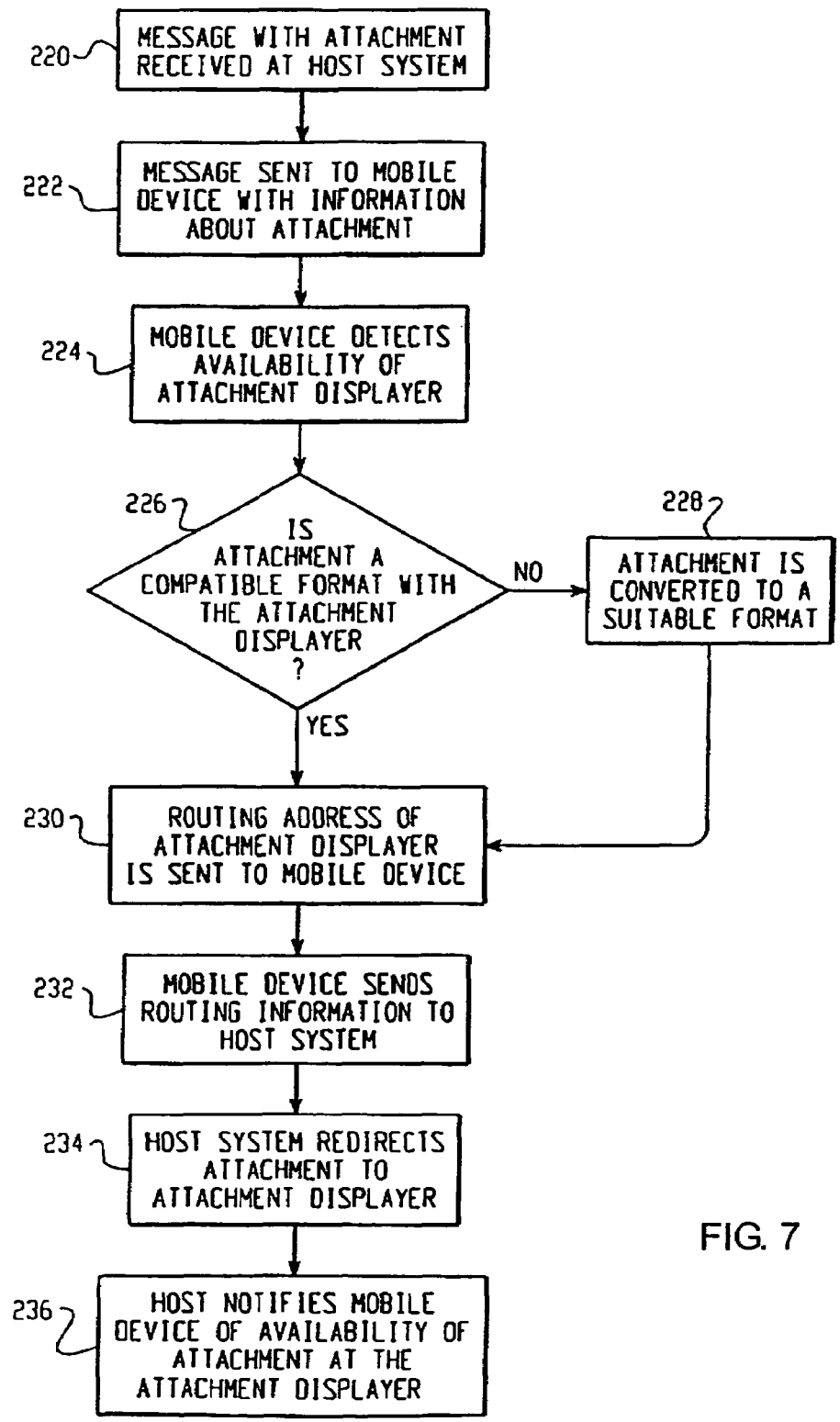
FIG. 7 is a flow diagram setting forth a method of redirecting a message attachment to an attachment displayer that is identified by the mobile device.

FIG. 7 is a flow diagram setting forth a method of redirecting a message attachment to an attachment displayer 216 that is identified by the mobile device 214B. In step 220, the datagram with an attachment 200 is received by the host system 202. The redirector component 202B of the host system 202 sends the datagram 200A to the mobile 214B with information about the attachment in step 222. Note that prior to this step, the attachment 200B is separated from the datagram 200, and is not directly transmitted to the mobile 214B along with the message portion of the datagram 200A. In step 224, the mobile device 214B is instructed to detect the availability of attachment displayers 216 in its local area. This step could be accomplished automatically when the datagram 200A is received, or it could be initiated through a menu selection by the user of the mobile device 214B. Preferably, this step 224 is carried out using a short-range wireless exchange 215A, 215B between the mobile device 214B and nearby attachment displayers 216.

Having obtained this information about the available attachment displayers 216, the mobile device 214B in this step 224 then transmits the availability information to the host system 202. In step 226, the host 202 determines whether the attachment 200B is a compatible format for at least one of the attachment displayers 216 that were discovered in step 224. If a compatible attachment displayer is found, then this device is selected for processing the attachment 200B. If a compatible device is not found, however, then in step 228 the attachment 200B is converted into a suitable format by the host system 202 for one of the discovered attachment displayers 216. In step 230, the attachment displayer 216 selected by the host system 202 then sends the mobile device 214B its electronic routing address. This electronic address can be an IP address, a telephone number, or a machine address. The mobile device 214B then sends the routing address of the attachment displayer 216 back to the host system 202 in step 232. In step 234, the attachment component 202C of the host system 202 uses the routing address to redirect the converted attachment 200B to the selected attachment displayer 216. The host system 202 then notifies the mobile device 214B, in step 236 that the attachment 200B has been redirected to the attachment displayer 216.

Alternatively to the method described in FIG. 7, instead of the host system 202 selecting the appropriate attachment displayer 216, the selection could be made at the mobile device 214B. For example, knowing the type of attachment at the mobile device 214B, which could be provided in the datagram 200A, and having discovered the available attachment displayers 216, the mobile device 214B could then select the appropriate attachment displayer 216, either automatically or based on input from the user of the mobile device 214B. Electronic address information of the selected attachment displayer 216 would then be routed to the host system 202, which would then transmit the attachment 200B directly to the selected attachment displayer 216 by whatever network connection is appropriate.

Figure 8:
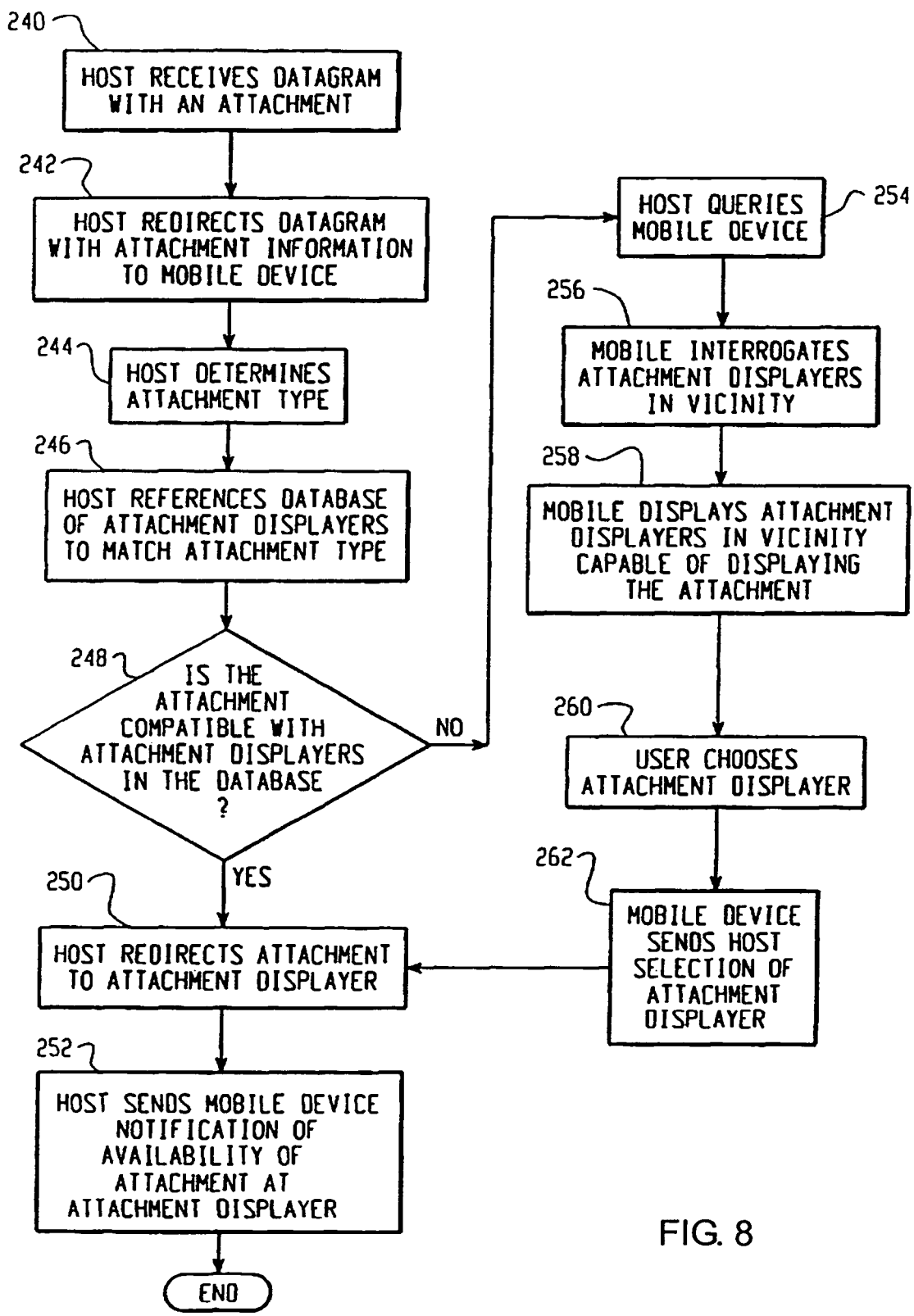
FIG. 8 is a flow diagram setting forth a method of redirecting a message attachment to an attachment displayer that is identified by the host system.

FIG. 8 is a flow diagram setting forth a method of redirecting a message attachment to an attachment displayer 216, where the attachment displayer 26 is identified by the host system 202. In step 240, the host system 202 receives a datagram 200 with an attachment The redirector component 202B sends the datagram (minus the attachment) 200A to the mobile 214B with information about the attachment in step 242. In step 244, the host system 202 determines the attachment format type. From a database of attachment displayers 216 coupled to the attachment component 202C of the host system 202, the host system 202 will match the attachment format type with a suitable attachment displayer 216 in step 246. In step 250, the host 202 redirects the attachment 200B to the selected attachment displayer 216 based on the information in the attachment component database. In step 252, the host sends a notification to the mobile device 214B when the attachment has been redirected and at which attachment displayer 216 the attachment will be available.

If the attachment is not compatible with any of the attachment displayers 216 in the attachment component database in step 248, then the host 202 may query the mobile device 214B in step 254. In step 256 the mobile device 214B interrogates attachment displayers 216 within the mobile device's vicinity, preferably via a short-range wireless communication exchange 215A, 215B. The mobile device 214B then displays the information that the responsive attachment displayers 216 sent back to the device 214B in step 258. This information can include routing address, compatibility and physical location. The user of the mobile device 214B may then make the selection of the attachment displayer 216 in step 260. In step 262, the mobile device 214B then sends the host system 202 the selection of the attachment displayer 216 including the routing information for the selected device 216.

Alternatively, the host system 202 may make the selection of the appropriate attachment displayer 216 using location information of the mobile device 214B. This location information can be derived based upon communications between the mobile device 214B and the wireless network 212, or it can be based upon a query of the mobile device 214B to transmit its location information to the host system 202, which may be obtainable by a variety of methods, such as an internal GPS receiver, a triangulation methodology with a plurality of base stations of the wireless network, etc. In any event, the host system 202 uses the mobile device's location information to select the most appropriate attachment displayer 216 by first selecting the attachment displayers 216 in the database of displayers that are capable of processing the transaction and then by comparing location information of the selected displayers 216 with the location information of the mobile device 214B.

Figure 9:
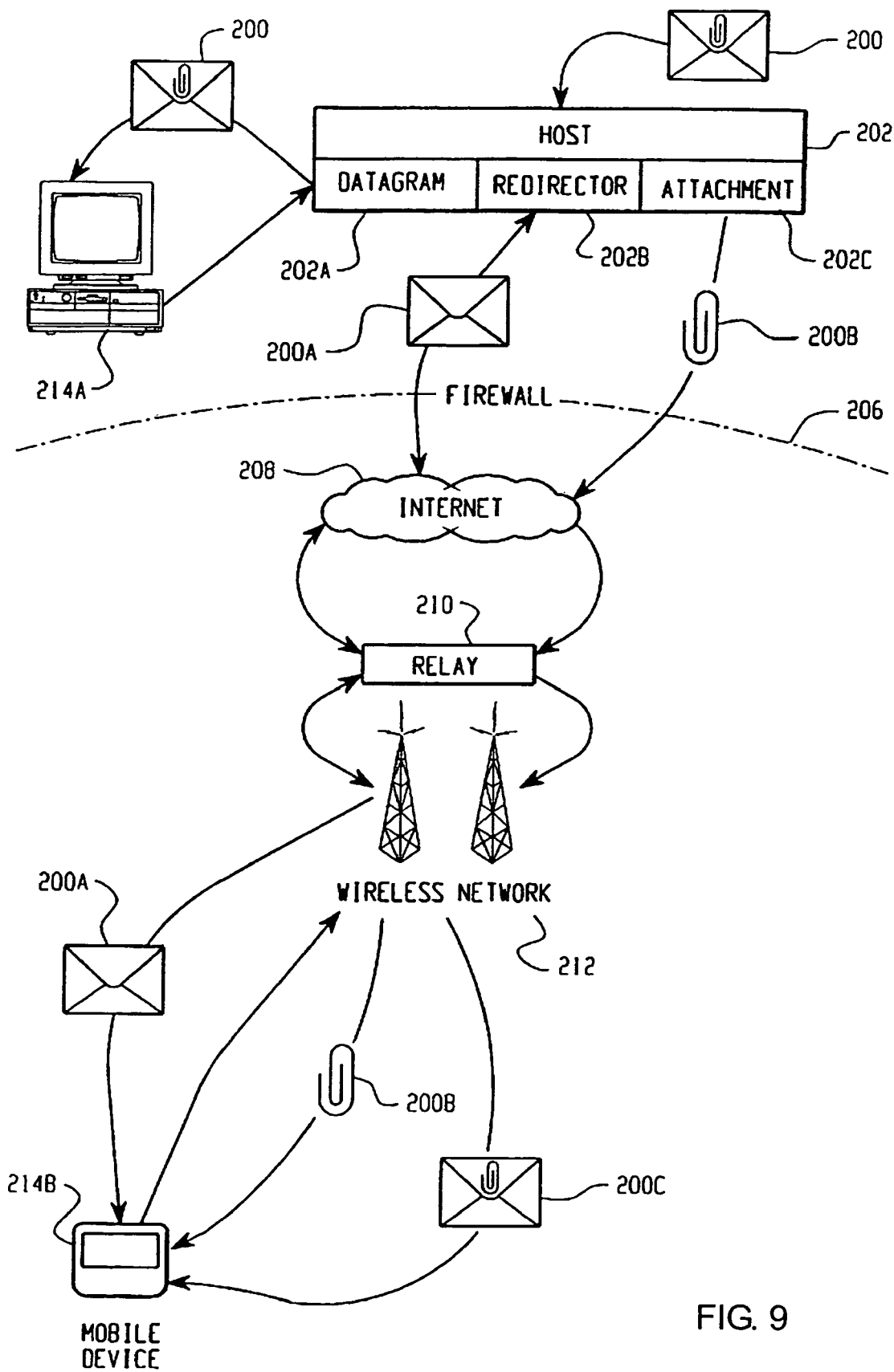
FIG. 9 is alternative system configuration of FIG. 6.

An alternative embodiment to FIG. 6 is illustrated in FIG. 9. FIG. 9 sets forth a system for redirecting messages having attachments 200, preferably using the redirector program discussed above. This system preferably includes an attachment processing component 202C that provides the additional functionality described below. The attachment processing component 202C converts attachments 200B into one or more formats that are acceptable for the mobile device 214B, prior to transmission to the mobile device 214B, such that the mobile device 214B can display the attachment 202B to the user thereby not requiring the use of attachment displayers 216. In this manner, the attachment displayers may be circumvented. However, in this case the wireless network 212 preferably is robust and has a large bandwidth to accommodate large attachment transmissions.

In one embodiment of the attachment processing component 202C, attachments are "trimmed" in that only a portion of the attachment 200B is sent to the mobile device 214B. If the user after viewing the attachment desires to see the rest of the attachment, then the user may send a command to push the remaining portion of the attachment to the mobile device 214B. Alternatively, the user may request the attachment to be sent to an attachment displayer 216. When the attachment processing component 202C converts the attachments, the converted attachment is preferably compressed in size and may be encrypted. The packaging of the attachments, if needed, is accomplished as discussed above. Advantageously, the processing and overhead associated with conversions from a plurality of attachment formats to one or more common formats compatible with the mobile device 214B is accomplished at the host system 202.

Redirection of message attachments between a host system, a mobile data communication device and one or more attachment displayers has been described in detail above. These general concepts may be further extended to the processing of not only message attachments but also other information, as described in further detail below. Therefore, in the following description, the more general term "information processor" is used in reference to any device that may process an attachment, file or other information. Although an attachment displayer is an example of an information processor, it will be appreciated that according to the embodiments described below, an information processor may also process types of information other than message attachments.

Figure 11:
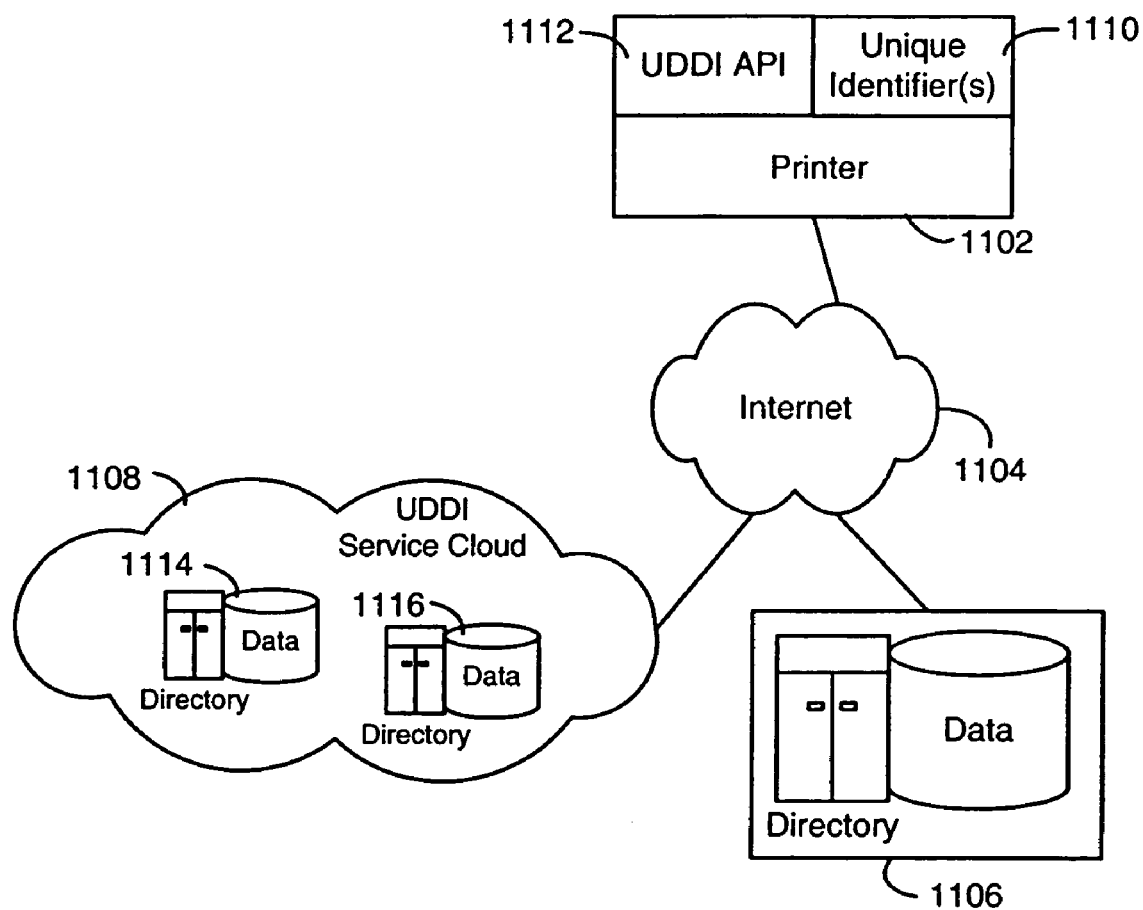
FIG. 11 is a block diagram of a system with an information processor and associated service information providers.

In accordance with an embodiment of the present invention, each information processor is registered or listed in a preferably publicly accessible directory. FIG. 11 is a block diagram of a system with an information processor and associated service information providers. The system shown in FIG. 11 includes a printer 1102 as the information processor, service information providers in the form of a services directory 1106 and a Universal Description, Discovery and Integration (UDDI) service cloud 1108, all connected to a WAN, shown as the Internet 1104. Although FIG. 11 shows a printer 1102 as the information processor, those skilled in the art will appreciate that similar arrangements may be implemented for any other attachment displayers, such as fax machines, telephones, cellular phones, copying machines, video displays, or any other type of device capable of processing an attachment. Similarly, depending upon the preferences of an owner or operator of the printer 1102, the printer 1102 and directory 1106 may instead be connected to a LAN instead of WAN 1104. For example, if the printer 1102 is owned by a company and is intended for use only by its employees through the company's LAN, then the printer 1102 and directory 1106 may be connected to the LAN instead of the Internet 1104. However, where the owner or operator of printer 1102 wishes to make printing services publicly available, then such an arrangement as shown in FIG. 11, with the printer 1102 and directory 1106 connected to a WAN such as the Internet 1104 may be preferred.

An information processor such as the printer 1102 may be associated with one or more service information providers. The directory 1106 and UDDI service cloud 1108 are examples of systems from which service information (i.e., any information required to access a service, determine the type of service, determine the location or type of the information processor that provides the service, etc.) may be obtained. Although two service information providers are shown in FIG. 11, an information processor may be associated with only one, or alternatively more than two, service information providers. Operations involving each of the service information providers 1106 and 1108 are described in further detail below.

With reference first to the directory 1106, the printer 1102 and any other information processor (not shown), like the attachment displayers described above in conjunction with FIGS. 6-8, may have respective unique identifiers, as shown at 1110 or routing addresses. In a further embodiment, each service or capability of each information processor may also have a unique address. The directory 1106 then associates specific information processor addresses with corresponding service addresses, if any, for that information processor, and may also associate inter-related information processors that may have some predetermined location, logical or service affiliation. For example, a printer, fax machine and a display or projector within a boardroom may be linked within the directory 1106. Similarly, a directory record for a black and white printer might also include a reference or link to a directory record for a physically proximate printer with colour or otherwise enhanced printing capabilities. Information processors or services could also be grouped by type of service to provide for service type searching. The operation and contents of the directory 1106 will be described in further detail below.

An information processor or service address may be of one or more address types, each address type suited for supporting different interaction modes, for example. An address type may be selected based on information processor owner or operator preference, the types of mobile devices that an information processor is intended to support, the type of transactions that an information processor is designed to handle, or possibly further alternative or additional criteria. It is also contemplated that each information processor may have more than one type of associated address, for example to support multiple device or transaction types.

Information processors or services using an IP addressing scheme, including the current version 4 (IPv4) or future versions such as version 6 (IPv6) may be best suited for implementing a software program interface such as an application programming interface (API) for interacting with the information processor or service, whereas a related Universal Resource Locator (URL) addressing scheme may be better suited for Hypertext Transfer Protocol (HTTP) or Secure HTTP (HTTPS) based interactions. E-mail addressing, on the other hand, may be used for asynchronous interactions such as in an information push technique. For example, the printer 1102 and its associated services such as black and white printing and colour printing may appear in the directory 1106 as follows:

For an IPv4 addressing scheme:
129.10.10.19 for main printer;
129.10.10.20 for black and white printing service on the main printer; and
129.10.10.21 for colour printing on the main printer.

For a URL addressing scheme:
xxx://public_printer.corp.com as a main printer address (where "xxx" is "http");
xxx://public_printer.corp.com/bw for black and white printing (where "xxx" is "http"); and
xxx://public_printer.corp.com/colour for colour printing (where "xxx" is "http").

In an E-mail addressing scheme:
public_printer@corp.com as a main printer SMTP address;
public_printer.bw@corp.com for black and white printing; and
public_printer.colour@corp.com for colour printing.

As described briefly above, more than one addressing scheme may be used in the directory 1106, and a user wishing to access one or more of the services of an information processor may then select the one of the addresses in a format best suited to a desired type of processing transaction.

The information processor and services directory 1106 may be indexed by a unique identifier. Each identifier may correspond to a particular registered information processor, although each service may also be indexed with a different identifier. The directory 1106 preferably provides at least an association between a unique identifier and an information processor. Where information processor services are separately indexed, an information processor record in the directory 1106 preferably refers to or is otherwise linked with the records of the services it provides. Each device and service may support configurable processing options, which may also be indexed by unique identifiers in the directory 1106. If the unique identifier is not the address of the information processor, where access to the services of the information processor is to be restricted for example, the directory should also provide device and/or service addresses. A further function of address translation might be provided by the directory 1106 in order to provide equivalent addresses, such as IP addresses, URL addresses and E-mail addresses, for different interaction modes.

In general, any service information required in order to access a particular information processor or its services could be provided in an information processor and service directory 1106. As such, other functions or operations associated with a directory 1106 will be apparent to those skilled in the art and are therefore considered to be within the scope of the present invention. When the service directory 1106 is indexed by unique identifiers, then service information may include the service address, as well as other service- or information processor-related information.

Turning now to the UDDI-based service information provider, the UDDI service cloud 1108, UDDI is one of the most common solutions for the discovery and integration of new services. UDDI provides a browser and API-centric view of dealing with dynamic services. The browser method treats potential service users as always online. The API method also assumes always online and continuous high speeds for program to program communication. The UDDI method of host service registration is described by the following documents, which may be found on the www.uddi.org Internet web site: Version 2.0 Programmer's API Specification, Version 2.0 Data Structure Specification, Version 2.0 Replication Specification Version 2.0 Operator's Specification, Executive White Paper (version 1.0), Technical White Paper (version 1.0), Using WSDL in a UDDI Registry 1.05, Using WSCL in a UDDI Registry (1.02) and Providing a Taxonomy for Use in UDDI Version 2.

As those skilled in the art will appreciate, a UDDI service cloud such as 1108 is normally distributed throughout the Internet 1104, but is shown connected to the Internet 1104 in FIG. 11 in order to avoid congestion in the drawing. In UDDI, a user is able to make user of so-called marketplace web sites and search portals, normally also connected to the Internet 1104, to find required services. The UDDI service cloud 1108 acts as a worldwide repository of service information that is accessible in a distributed manner through the Internet 1104. Behind the service cloud 1108 are actually databases or directories 1114, 1116, perhaps using LDAP services or some other fast look-up technology to satisfy service requests. These databases 1114, 1116 might be distributed around the globe and may communicate using a UDDI propagation technique as defined in the UDDI specification. Populating these databases 1114, 1116 are service providers that register service information associated with their information processors and/or services in the large service registry system.

UDDI and other similar types of service registry definitions all define a central store where all services can be found if desired. The UDDI specifications describe ways to manipulate, change and replicate this information between databases in the UDDI cloud 1108. Additionally, the services may categorized into taxonomies, to further help with locating and identifying the service needed. Taxonomies provide for classification and identification of registered services.

When a company, person or organization decides that they want to create a public or semi-public service that should be made available to a wide audience of users, the service creator or service provider propagates the service information to the UDDI service cloud 1108, one of its underlying databases or directories 1114, 1116, or possibly a new database or directory. In FIG. 11, this is accomplished through the UDDI API 1112 in the printer 1102. The UDDI API 1112 may be configured to automatically publish service information for the printer 1102 or its services to a new or existing database or directory in the UDDI service cloud 1108. Once the service information has been published, a user of a mobile communication device (not shown) may access the UDDI service cloud 1108 to search for a particular type of service, to search for information processors in a particular location, or to browse service information for registered information processors and services to find an information processor or service supporting a processing operation to be performed. Alternatively, the UDDI service cloud 1108 may be accessed using a unique identifier 1110 of an information processor or service to obtain service information for a particular information processor or service associated with the unique identifier.

The UDDI API 1112 may be developed and installed by a manufacturer or owner of an information processor such as the printer 1102. In addition, the API 1112 may be available separately from an information processor, and each time it is purchased and installed by an owner or operator of an information processor, a new service registry entry is created, in the UDDI service cloud 1108. Existing information processors could thereby be enabled for discovery via UDDI whenever its services are to be made available.

Within the UDDI cloud 1108, further propagation of service information may take place so that the service information is distributed throughout the entire system of databases or directories 1114, 1116. Essentially, the act of publishing the service information once allows for a "publish once access anywhere" design approach. This publishing can be done programmatically or through manual processes through the UDDI API definitions. Part of UDDI is a rich set of XML and SOAP-based commands that allow service providers to securely establish, modify and delete entries in UDDI databases.

A UDDI implementation may also provide a list of new services for potential service users. Service users are typically web browser users, but could also be software applications or programs looking for services. A service user would typically start up a web browser to search for service information and perform searches until the information is found. This model is based on a request/response model, or a pull architecture. However, it is also possible that services may be advertised by "pushing" service information to users. Such service advertising is not restricted only to UDDI-based systems, but may also be implemented in directory-based systems as well.

As described briefly above, an information processor or its services may be associated with more than one type of service information provider. For a private network, in which access to information processors and services are restricted to network users, a private directory such as 1106 may be most suitable. When an information processor is to be accessible to a larger or more distributed group of users, a UDDI-based system may be more feasible. In some circumstances, such as when only certain services are to be publicly accessible, whereas others are to be available only to a specific group of users, then public services could be registered in a UDDI service cloud and private services could be listed in a directory.

Figure 12:
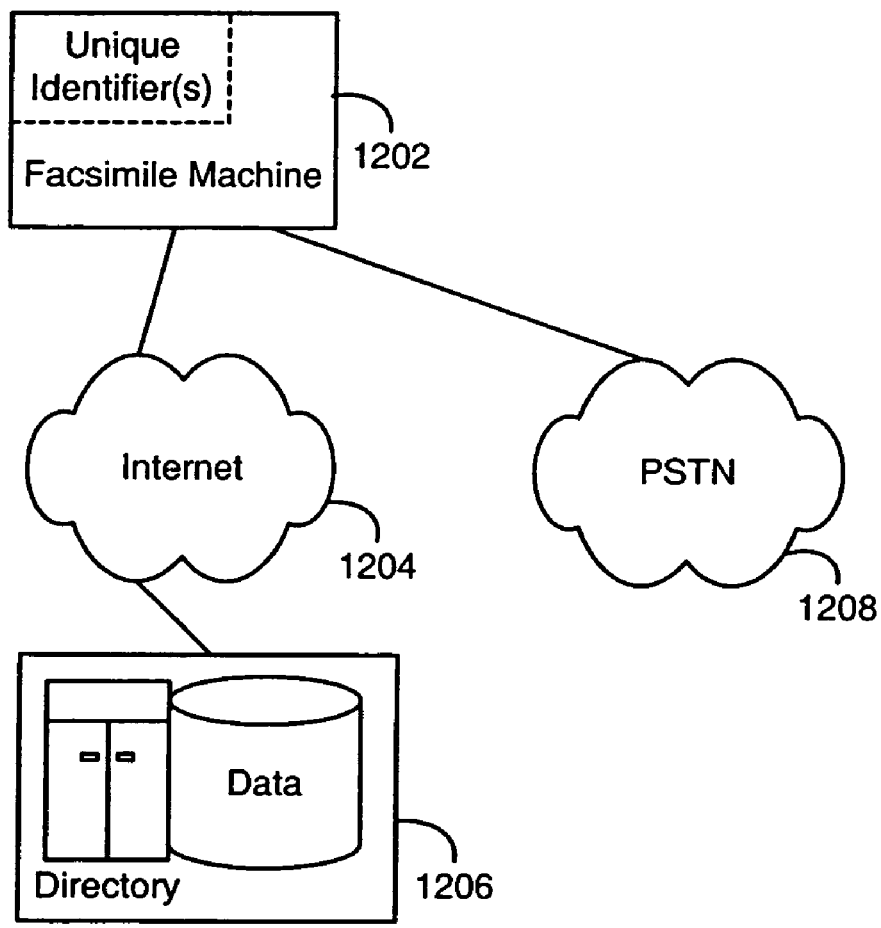
FIG. 12 is a block diagram of an alternate information processor and directory arrangement.

FIG. 12 is a block diagram of an alternate information processor and directory arrangement. This drawing illustrates the application of the unique address concept to a fax machine, a further example of an information processor. The fax machine 1202 is shown with not only the traditional phone number, which is effectively an address in a public switched telephone network (PSTN) 1208, but also a network address on a network such as the Internet 1204. As described above, the network 1204 may be a LAN or other WAN instead of the Internet 1204.

The fax machine 1202 preferably has a unique associated identifier by which related information such as one or more device addresses, service addresses or links to records for associated services are indexed in the directory 1206. With the additional IP, URL and E-mail addressing as described above, the fax machine 1202 is effectively converted into an intelligent device capable of providing its capabilities on the Internet or another network, such as an Internet based "print-to-fax" device, while retaining its more traditional PSTN-based facsimile functions.

FIG. 12 shows a unique identifier and directory-based system. It should be apparent from FIG. 11 and the description above that the fax machine 1202 and/or its services could also or instead be registered with, and associated service information could be obtained from, a UDDI service cloud, as indicated by the dashed lines enclosing the unique identifiers in the fax machine 1202.

Figure 13:
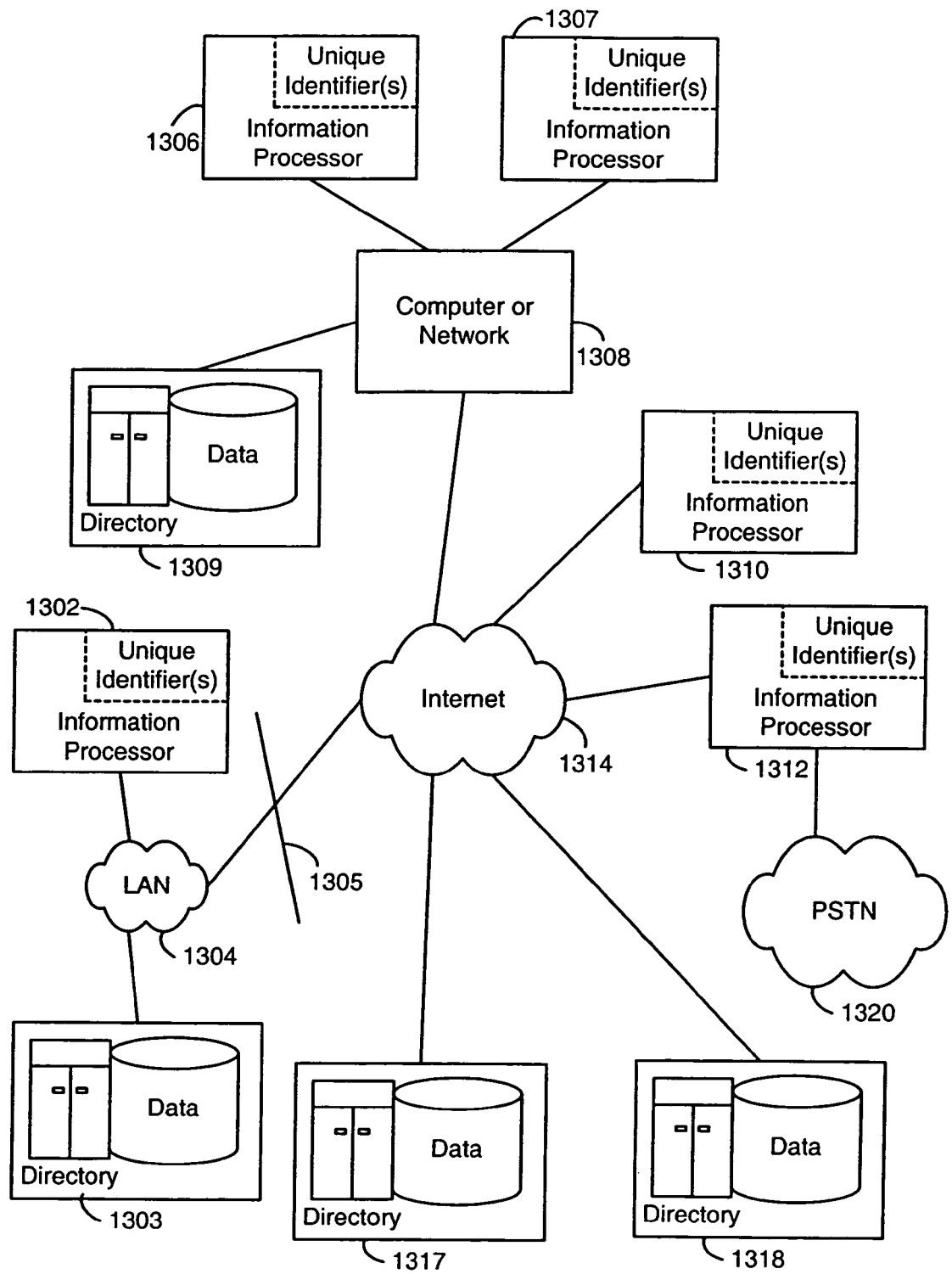
FIG. 13 is a block diagram showing a system of information processors, networks and directories.

FIGS. 11 and 12 each show an example of a single information processor and directory. However, the invention is in no way limited to such arrangements. FIG. 13 is a block diagram showing a system of information processors, networks and directories. The system of FIG. 13 includes a plurality of information processors 1302, 1306, 1307, 1310 and 1312, a LAN 1304 with an associated information processor and service directory 1303 and security firewall 1305, a computer or network 1308 with its information processor and service directory 1309, a wide area network 1314 such as the Internet, with one or more information processor and service directories 1317 and 1318, and a PSTN 1320.

Each information processor 1302, 1306, 1307, 1310 and 1312 in FIG. 13 may be any device or system capable of processing files or other information. Some information processors such as 1310 may be connected to the WAN 1314, while others such as 1302, 1306 and 1307 communicate with the WAN 1314 through further systems 1304 and 1308. One or more of the information processors, as shown at 1312, may also have interfaces to and addresses on additional networks such as the PSTN 1320. Although the system diagram of FIG. 13 is more general than those shown in FIGS. 11 and 12, those skilled in the art will appreciate that still other arrangements of information processors, networks and directories may well be associated with the same WAN 1314. Also, any of the information processors or services supported by the information processors may also or instead be registered with a UDDI service cloud, as described above. Thus, FIG. 13 is intended for illustrative purposes only; the invention is in no way limited thereto.

In FIG. 13, information processors such as 1310 and their associated services are registered in an information processor and service directory 1317 on the WAN 1314. Information processors such as 1312 may similarly be registered in WAN directory 1317, even though such processors, like the fax machine 1202 in FIG. 12, may have additional addresses on networks such as the PSTN 1320. For each registered information processor and possibly each service provided thereby, the directory 1317 may store such information and provide such functionality as described above, including for example associating a unique identifier with an information processor or service, any associated configurable processing options and one or more addresses of the associated information processor or service, and providing alternate equivalent addresses, such as IP addresses, URL addresses and E-mail addresses, for different interaction modes for an information processor or service.

Other information processors such as 1302, 1306 and 1307 may be configured for operation on a LAN 1304 or in conjunction with a computer or network 1308. The computer 1308 may for example be a server computer or an ISP system providing a gateway for subscriber systems (not shown) to access the Internet 1314. Each of the systems 1304 and 1308 may have its own local information processor and service directory 1303 and 1309 in which information processors connected thereto and their associated services are registered. Such local directories would preferably be accessible by users authorized to access the systems 1304 and 1309. As described briefly above for example, where LAN 1304 is a corporate network, located behind a security firewall 1305, the information processor 1302 and directory 1303 may only be accessible by corporate network users. Alternatively, the corporate network information processor 1302 or the directory 1303 itself might also be registered in the directory 1317 if local services are to be offered outside the network 1304. Any access to such a restricted information processor 1302 or information in the directory 1303 could then be controlled at the firewall 1305.

Similar access arrangements could be implemented at the system 1308. The information processors 1306 and 1307 would preferably be registered in a local directory 1309 as well as the WAN directory 1317 if the services of the information processors 1306 and 1307 are to be provided to users through the WAN 1314.

Each of the networks shown in FIG. 13 may further include additional directories, such as shown at 1318. For example, directories may be specific to particular services or types of devices. In the system of FIG. 13, directory 1317 may be a printer or print service directory which stores information for all printers or other information processors supporting print services that are connected to or accessible through the WAN 1317. The directory 1318 may similarly be a fax machine and service directory. Other specific multiple-directory arrangements will also be apparent to those skilled in the art.

Although system topologies may vary, the general operations of the directories and information processors will be substantially the same. An information processor or service may first be selected, for example by a user of a mobile communication device or a host system associated with the mobile device as described above. In one embodiment of the invention, a mobile device user selects an information processor at his or her current location. A directory may in some cases then be queried, with a unique identifier of the selected information processor or service, for example. The service directory returns specific information requested or all information for the information processor or service. Service information may also or instead be available from a UDDI registry or service cloud. As described above, UDDI may support service type searching, identifier-based access, browsing and selection of processors or services, or possible other types of access and service or processor selection.

Figure 14:
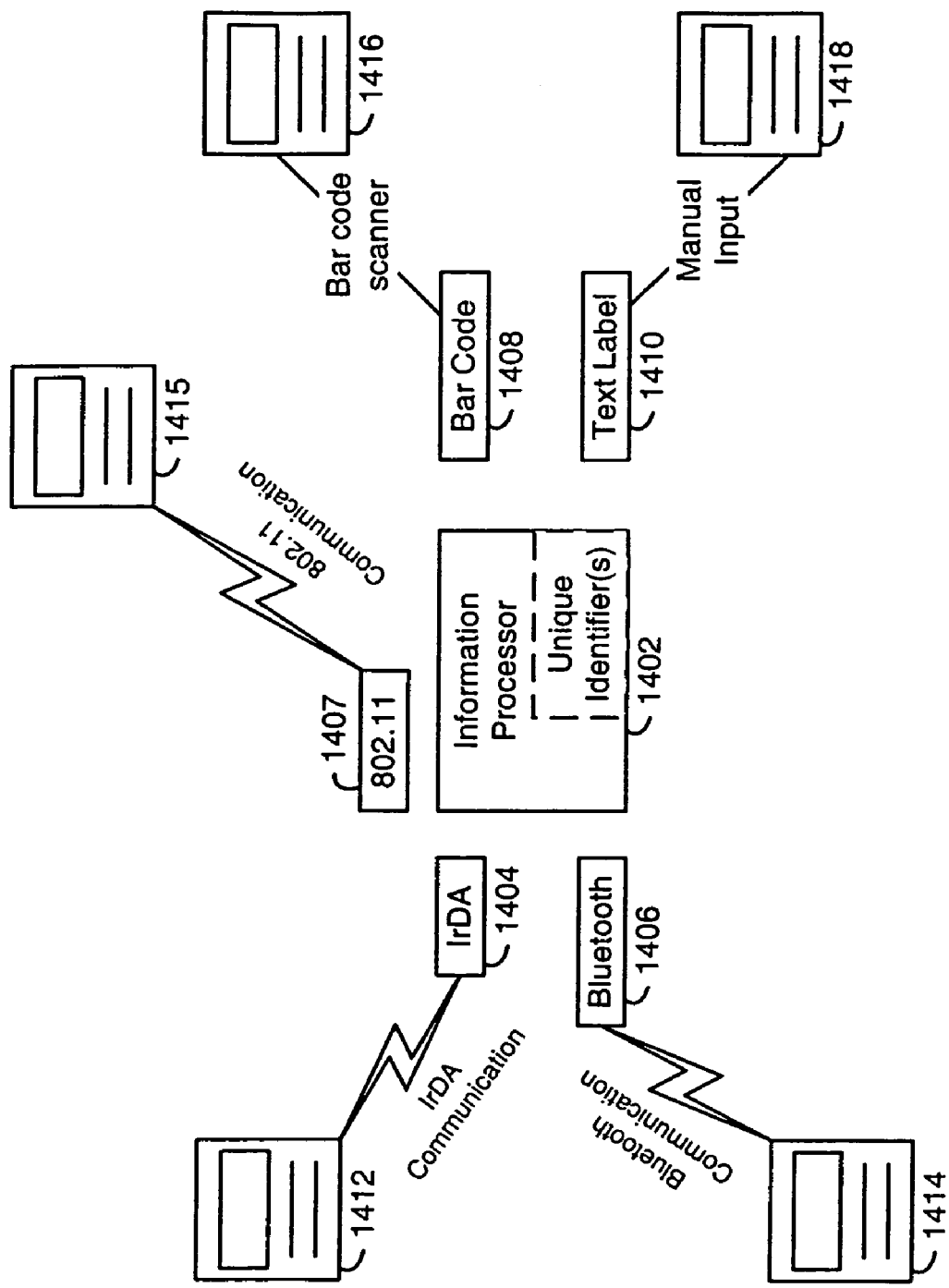
FIG. 14 illustrates several interfaces using which a unique identifier associated with an information processor may be determined.

In a directory-based system, if an information processor having a unique identifier is selected, then its unique identifier, which as described above may or may not be its associated routing address, must then be determined. FIG. 14 illustrates several interfaces using which a unique identifier associated with an information processor may be determined. As shown in the Figure, an information processor 1402 may incorporate an infrared module, shown as an Infrared Data Association (IrDA) compatible interface 1404, an RF module such as a Bluetooth module 1406 or an 802.11 module 1407, a bar code 1408 or a text label 1410. The unique identifier associated with the information processor 1402, as well as any identifiers associated with the services of the processor 1402 can then be determined and input to a similarly-enabled mobile communication device 1412-1418 as described in further detail below. As will be apparent to those skilled in the art, "Bluetooth" and "802.11" refer to sets of specifications, available from the Institute of Electrical and Electronics Engineers, relating to wireless personal area networks and wireless LANs, respectively.

It should be noted that the interfaces shown in FIG. 14 are not mutually exclusive. An information processor 1402 may incorporate more than one of the interfaces 1404, 1406, 1407, 1408 and 1410 in order to provide alternative identifier determination processes. Similarly, a single mobile device may have more than one corresponding interface, such that a user may have a choice as to how an information processor or service identifier is to be determined and input to the device.

Each of the different types of interfaces in FIG. 14 provides a different mechanism for communicating with a mobile device. Three of these are active (powered) interfaces that can be triggered to transmit the unique identifier to a mobile device, whereas the others are passive, relying on certain capabilities of the mobile device to capture the unique identifier of the information processor 1402.

The active interfaces shown in FIG. 14 are based on an IrDA port 1404, a Bluetooth communication module 1406, and an 802.11 module 1407. When queried by a similarly enabled mobile communication device 1412, 1414, 1415, these interfaces preferably transmit at least the unique identifier associated with the information processor 1402, and possibly additional identifiers corresponding to each service supported by the information processor 1402, back to the mobile device. As shown in FIG. 10 and described above, a mobile device may include one or more short-range communication subsystems 940 which would provide for such communication between the mobile device and an information processor 1402. An additional benefit of active interfaces such as 1404, 1406 and 1407 is that they can not only transmit the unique identifier to the mobile device, but may also be used to exchange further information with a mobile device, as described in detail below. However, they are dependent on their power source to be operational.

The passive interfaces shown in FIG. 14 include one or more encoded barcodes 1408 and text labels 1410. A barcode scanner, implemented in a mobile device as an auxiliary I/O subsystem 928 (FIG. 10) for example, may be used to automatically determine a unique identifier coded into a barcode label 1408. If an information processor 1402 and its services are separately registered in a directory, the processor 1402 may have multiple barcode labels, any of which may be scanned depending upon the particular service to be accessed. Text labeling (1410) of an information processor 1402 provides a further option for a mobile device user to manually enter the appropriate identifier using a keyboard or other such user interface on a mobile device. When a barcode 1408 is printed on a label attached to the device 1402, it will be apparent that processor and/or service identifier text 1410 may be printed on the same label, provided that the text does not overlap or otherwise interfere with the barcode 1408. Passive interfaces such as 1408 and 1410 are inexpensive and do not need power source maintenance. However, they cannot exchange data with mobile devices.

Those skilled in the art will appreciate that other additional or alternative interfaces may also facilitate transfer of unique identifiers from an information processor to a mobile device and possibly exchange of further information between an information processor and device. For example, coded surface acoustic wave (SAW) based communication subsystems such as those disclosed in co-pending U.S. patent application Ser. No. 09/863,944, titled "Wireless Communication System Using Surface Acoustic Wave (SAW) Second Harmonic Techniques", filed on May 23, 2001, and U.S. patent application Ser. No. 09/864,507, titled "Wireless Communication System Using Surface Acoustic Wave (SAW) Single-Phase Unidirectional Transducer (SPUDT) Type Techniques", filed on May 24, 2001, both incorporated in their entirety herein by reference, are further contemplated passive interfaces.

A mobile communication device is thereby able to determine the unique identifier associated with a particular information processor and/or service. A query can then be prepared and sent to a directory in which the information processor or service has been registered. Like information processor and service addresses, directories may also be addressed according to one or more of the above schemes, depending upon a preferred interaction mechanism. Directory addresses may for example be available from a central repository or provided by the information processor through one of the interfaces 1404, 1406, 1407, 1408, 1410. The directory responds to such a query with any information required by the device to use the selected information processor or service, as described in further detail below. A mobile device may also obtain service information from a UDDI service cloud or like system, as described above.

Figure 15:
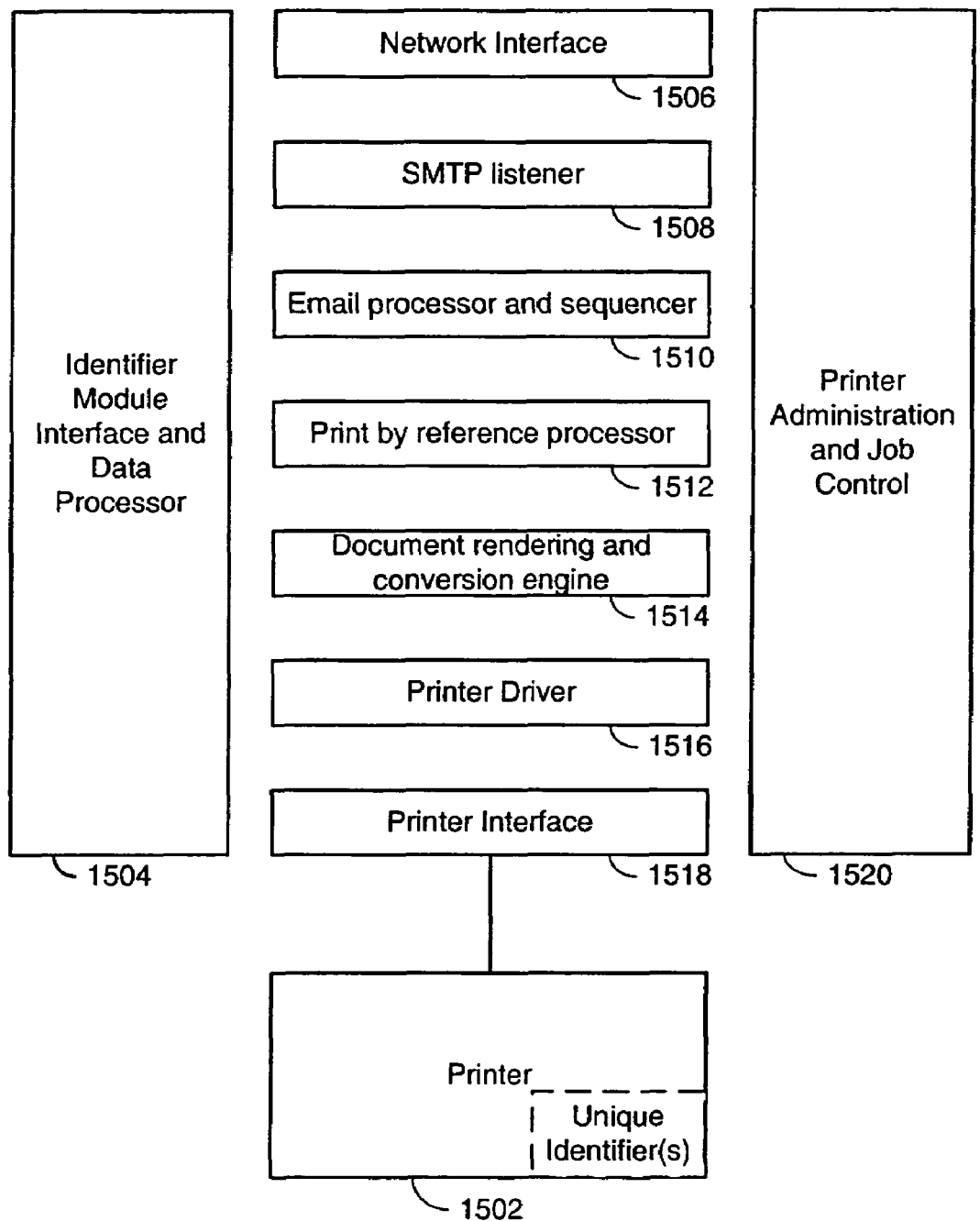
FIG. 15 shows the major functional components of a sample information processor, a printer.

Before proceeding with a detailed description of mobile device-controlled processing by an information processor, the functional components or modules of an example information processor will first be described. FIG. 15 shows the major functional components of a sample information processor, a printer. The printer in FIG. 15 is an illustrative example of an information processor, although it is to be understood that other information processors may include similar functional components.

As shown in FIG. 15, in accordance with an aspect of the invention a printer may comprise, in addition to a substantially conventional printing apparatus designated 1502, an identifier module interface and data processor 1504, a network interface 1506, and SMTP listener 1508, an E-mail processor and sequencer 1510, a print by reference processor 1512, a document rendering and conversion engine 1514, a printer driver 1516, a printer interface 1518 and a printer administration and job control module 1520.

The identifier module interface and data processor module 1504 would normally be implemented only when the printer is enabled with an active interface to a mobile device, such as the IrDA port 1404 or Bluetooth module 1406 shown in FIG. 14. The interface and data processor module 1504 manages communication to and from the active interfaces, including for example receipt of and responses to unique identifier queries from mobile devices and receipt of information to be printed from the mobile device, and also acts as an overall data and command processor. For example, in response to a print by reference command signal (described below) received from a mobile device through an active interface, the module 1504 would preferably invoke an operation by the print by reference processor to retrieve data referenced in the command signal and pass the data to the rendering and conversion engine. The interface and data processor module 1504 may also be configured to effectively advertise device identifiers or services by transmitting signals from an active interface. Such signals would serve to notify mobile devices in the vicinity of the printer of the availability of the printer 1502 and its associated services. Since only active interfaces provide for exchange of information between an information processor and a mobile device, an identifier module and data processor need only be implemented if an information processor such as 1502 includes at least one active interface.

The network interface module 1506, as will be apparent to those skilled in the art, provides network connectivity for the information processor and preferably supports popular network protocols. In the example system of FIG. 11, the printer 1102 preferably includes a network interface that supports such protocols as TCP/IP and HTTP, commonly used to exchange information on the Internet.

An SMTP listener 1508 provides a mechanism for receiving SMTP messages. Other message interfaces will be apparent to those skilled in the art and could be included in addition to or instead of the SMTP listener 1508 to change or expand the messaging capabilities of an information processor.

The E-mail processor and sequencer module 1510 preferably provides the functionality of opening SMTP and possibly other messages, decomposing the message into individual components such as message text and attachments, and passing a sequenced data stream to downstream processing components such as the rendering and conversion engine 1514. The E-mail processor and sequencer module 1510 also preferably creates administration messages that may be packaged for example as SMTP messages to be emailed back to a user with the result of a print request.

A print by reference processor 1512 provides for search and print functionality. The print by reference processor 1512 receives reference locators provided in a print by reference command (described below) from a mobile device and uses them to retrieve information and pass such information to downstream processing components such as the rendering and conversion engine 1514.

A rendering and conversion engine 1514 accepts data streams and documents and converts them to formats that can be rendered on the printer 1502. Once information has been converted, the rendering and conversion engine 1514 uses the suitable printer driver 1516 to prepare a data stream appropriate for the printer 1502. The printer driver 1516 provides the software interface for services available on the physical printer 1502, whereas the printer interface 1518 provides the physical interface to the printer 1502.

The printer administration and job control module 1520 manages such administration and control activities as printer condition monitoring, print job queuing, printer or print job error recovery, print job retries, printer and print job status monitoring and the like.

Of the modules shown in FIG. 15, the identifier module interface and data processor 1504 (where at least one active interface is provided), the network interface 1506, the SMTP listener 1508 or similar messaging module and the E-mail processor and sequencer module 1510 would likely be common to printers and other types of information processors. The remaining modules as shown in FIG. 15 are printer-specific modules, although other information processors may include components and modules that perform similar functions.

Although not shown in FIG. 15, a UDDI API may also be provided if the printer or any of its services are to be accessible via UDDI. As described above, UDDI-based information processor or service access may be provided instead of or in addition to identifier and directory-based processor or service access.

A print by reference processor 1512, as described above, embodies a search and retrieve function. Thus, other information processors may include a similar processor module to retrieve and display, E-mail, fax, transmit or perform other operations on information identified in a command signal or alternatively to retrieve and execute a software application or automated script. Similarly, although the document rendering and conversion engine 1514 in FIG. 15 converts a document to a printer format, a rendering and conversion engine may be provided in other information processors to convert information into appropriate display, transfer or processing formats. For example, received information intended for input to a particular system or software program associated with the information processor may be converted into a suitable input format by a rendering and conversion engine. Although other types of information processor would not necessarily include a printer driver 1516, a printer interface 1518 and a printer administration and job control module 1520, the driver, interface and control functionality would typically be provided by information processor-specific modules.

The management of information processing operations on an information processor will now be described in detail with reference to FIGS. 16-19. As above, the description relates to a printer as an illustrative example of an information processor, but the invention is in no way limited thereto. In addition, although identifier and directory-based operations are described below, information processors and services may also or instead be discovered and accessed through UDDI.

Figure 16:
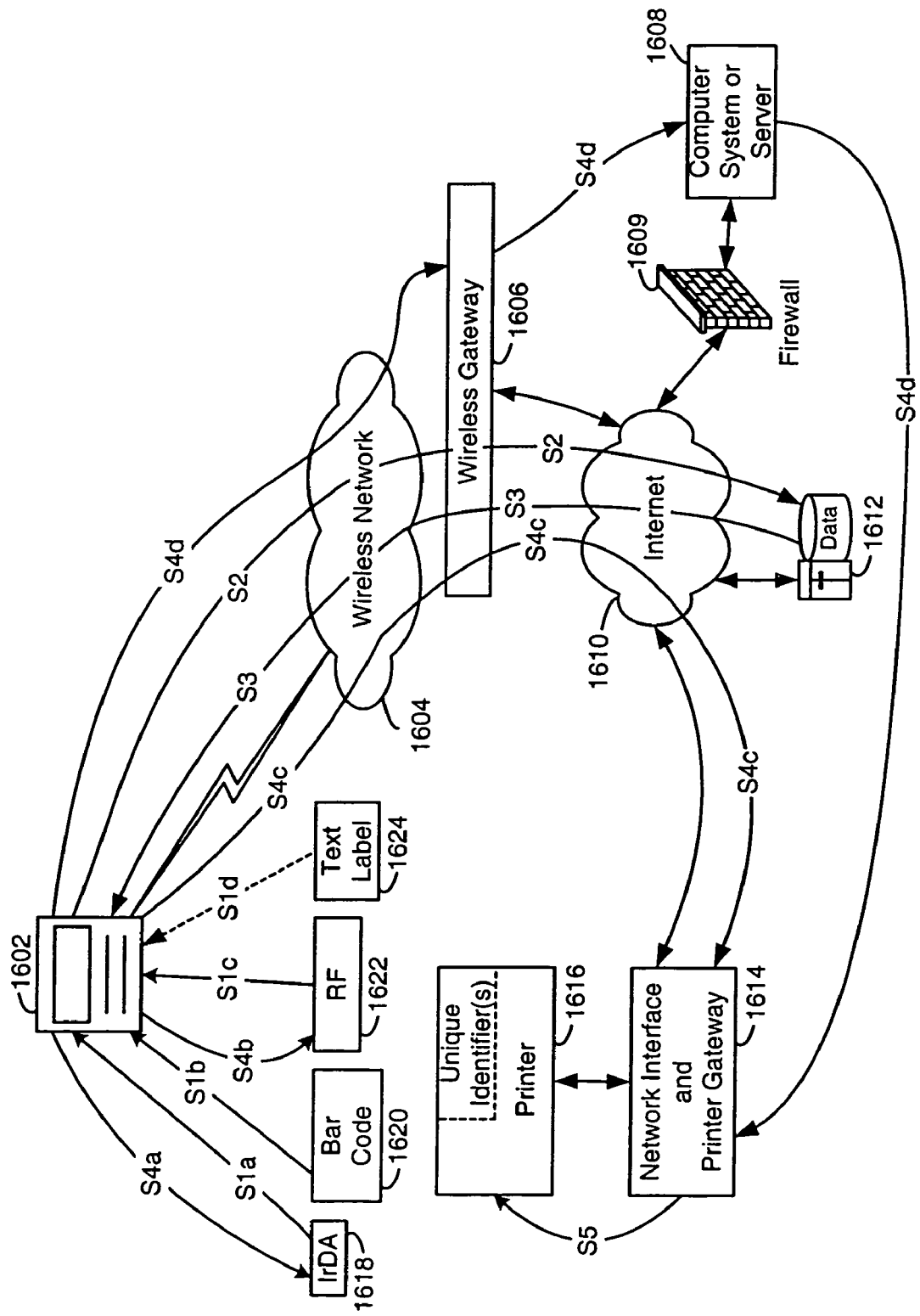
FIG. 16 is a system diagram illustrating a mobile device-controlled print operation.

FIG. 16 is a system diagram illustrating a mobile device-controlled print operation. The system of FIG. 16 includes a mobile communication device 1602, a wireless network 1604, a wireless gateway 1606, a corporate or other system 1608 with a security firewall 1609, a WAN such as the Internet 1610, an information processor and services directory 1612, a network interface and printer gateway 1614, a printer 1616, and interfaces 1618, 1620, 1622 and 1624.

The mobile communication device 1602 is adapted to operate within the wireless communication network 1604. A wireless gateway 1606 provides for communication from the wireless network 1604 to other networks such as the WAN or Internet 1610 and possibly other networks such as 1608. The processor and services directory 1612 is preferably accessible through the WAN or Internet 1610. The network interface and printer gateway 1614 includes such components or modules as 1504 through 1520 (FIG. 15) and provides for connection of the printer 1616 to the Internet 1610 and possibly communication between the printer 1616 and the device 1602 where an active interface such as IrDA port 1618 or an RF module 1622 is implemented. The RF module may, for example, be a Bluetooth module, and 802.11 module or other short-range RF communications interface. The interfaces 1618, 1620, 1622 and 1624 operate substantially as described above to provide one or more unique identifiers associated with the printer 1616 or its services to the mobile communication device 1602. The active interfaces 1618 and 1622 further provide for the exchange of information between the printer 1616 and device 1602.

As described briefly above, service information associated with the information processor and/or any of its services may be stored in the directory 1612 and is preferably indexed according to a unique identifier associated with the processor (printer 1616) or the services supported thereby. The device 1602 first determines the unique identifier of the printer 1616 or a selected one of its services. If the device 1602 incorporates multiple interfaces, then the unique address for the selected printer 1616 or service may be captured using any of such interfaces. The different identifier capture operations corresponding to the four interfaces 1618 through 1624 are shown in FIG. 16 at S1*a*, S1*b*, S1*c* and S1*d*.

In the operation at S1*a*, the identifier is captured via the IrDA port 1618 on the printer 1616 and a corresponding port (not shown) in the device 1602. The identifier may be transmitted to the device 1602 in response to a query (not shown) from the device 1602 to the printer 1616 or transmitted from the printer 1616 as an advertising or notify signal. At S1*b* the identifier is captured by scanning an appropriate barcode 1620 with a scanner in the device 1602. S1*c* indicates an identifier capture operation using the RF printer interface 1622. A manual identifier entry operation using a keyboard or other input interface on the device 1602, with reference to text labeling 1624, is designated S1*d*. Depending on the particular interfaces implemented in the printer 1616 and the device 1602, either of these operations S1*a*-S1*d* may be performed to capture the identifier for the printer 1616 or an associated service.

When the printer or service identifier has been captured by the mobile device 1602, a query (S2) may be sent to the directory 1612 for service information on the service or printer 1616. A routing address of the directory 1612, which may for example be an IP address, a URL or an E-mail address, may be known to the user of the device 1602 or stored on the device 1602. Alternatively, the directory routing address may be available from a central directory address repository, or from some other source accessible by the mobile device 1602. The query is transmitted through the wireless network 1604, gateway 1606 and Internet 1610 to the directory 1612.

The directory 1612 then responds (S3) to the query with service information relating to the selected printer 1616 or service. The service information may include an address, such as an IP address, URL or E-mail address, of the printer 1616 or the particular selected service, an indication of which if any print settings may be configured in a print request, a default or preferred information exchange protocol, as well as any other information required by the device 1602 in order to use the printer 1616 or its services. The device 1602 may then store the service information provided by the directory into an internal data store for later retrieval and use in subsequent print operations. The directory 1612 may also provide information for any related registered information processors and services, such as other information processors in the vicinity of the printer 1616 or other enhanced services offered by the printer 1616 or other processors in its vicinity.

When the printer 1602 or its services have been registered in a UDDI system, a device 1602 may discover the printer 1602 or services by searching or browsing databases or directories in a UDDI service cloud through the wireless network 1604, wireless gateway 1606 and Internet 1610. Service information for an information processor or service may then be obtained by the mobile device 1602 through the Internet 1610, wireless gateway 1606 and wireless network 1604.

Figure 20:
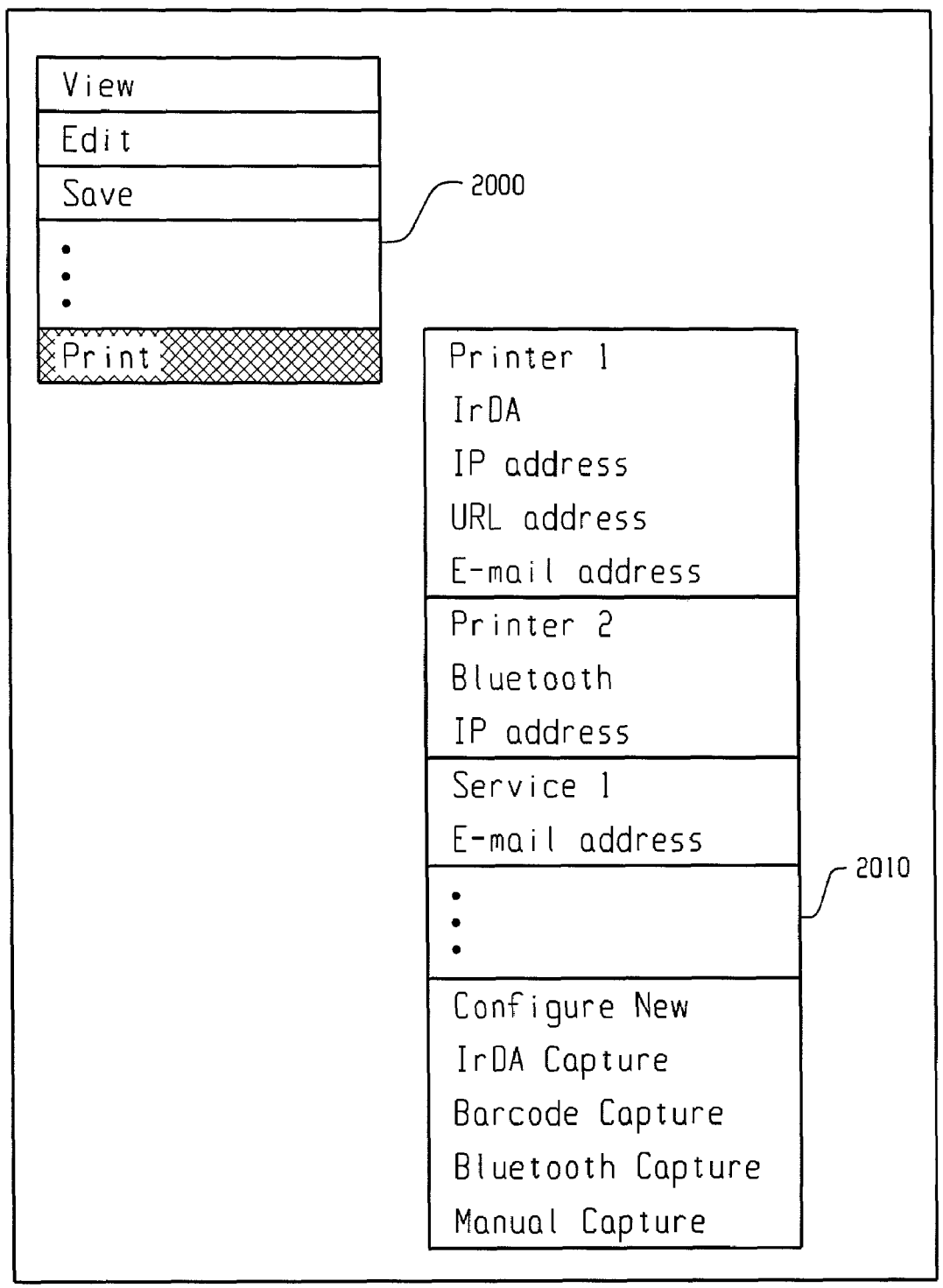
FIG. 20 shows an example menu relating to a print function.

The mobile device 1602 may also store the routing address and any other information required to use a particular printer or service in an internal data store. For example, the information associated with a printer in a user's office or home may be stored in a device store and designated as a default information processor for print operations, and the information for other printers may be stored on the device when received. Instead of executing the initial printer identifier capture and directory query operations, a user may then simply select a printer or service from a list of those for which required information is stored on the device. A user interface such as a menu-driven interface may be provided on the device to allow the user to select an operation, such as print, and then a particular information processor, such as a printer, for which all required information is resident on the mobile device. The user may display a menu 2000 as depicted in FIG. 20 by providing a particular input to the device using a device keyboard, keypad or auxiliary input element while information is being displayed on the device screen or a device screen cursor is located on an information indicator or identifier (a file name, message title or the like) for example.

The menu 2000 preferably includes operations relevant to the particular type of information displayed or selected when the menu is invoked. In the menu 2000, the user may view, edit, save or print the selected information. Further functions may also be supported, as indicated by the "dots" in the menu 2000.

When the user selects "print" from the menu 2000, by highlighting "print" with a cursor as indicated by shading in the menu 2000 and depressing a key or providing some other input on the device for example, a further menu or list 2010 relating to the print function will preferably be displayed. An example of menu 2010 is depicted in FIG. 20.

Print menu 2010 preferably lists all printers and services for which all required service information is available on the device, i.e. printer 1, printer 2 and service 1 in the above example, as well as a selection to use a new printer or service. The print menu 2010 may also provide a choice between transfer mechanisms and/or addressing schemes to be used for each configured printer or service. For a new printer or service, the user is preferably able to select an identifier capture mode, or alternatively a UDDI-based discovery operation. Such options for each configured or new printer or service may instead be displayed in a further menu upon selection of a particular printer or service or selection to configure a new printer or service. As those skilled in the art will appreciate, further and alternative menu choices may also be provided. Example menus 2000 and 2010 are intended for illustrative purposes only.

Thus, using such an interface, a user may select to print using a printer for which service information is already stored on the device and thereby avoid the above initial operations associated with a print operation. If the user selects to configure a new printer or service, the above identifier capture and possible directory query would then proceed substantially as described above, or alternatively, a new printer or service may be located and configured by obtaining service information.

Once the service information is available on a mobile device, the mobile device sends a communication signal to the information processor. In response to the communication signal, the information processor performs an information processing operation. In the example of FIG. 16, data resident on the mobile device 1602 is to be printed on the printer 1616. When both the printer 1616 and the mobile device 1602 include active interfaces, the communication signal, i.e. the information to be printed, may be sent to the printer 1616 directly through an active interface, thereby avoiding the airtime costs and time delay associated with transmission of the information over the wireless network 1604. As indicated at S4a and S4b respectively, the information may be transmitted via the IrDA port 1618 or the RF module 1622, in response to a menu selection as described above for, example. Path S4c illustrates information exchange using an IP address or URL address for the printer 1616, provided by the directory 1612. IP or URL address-based information transfer may be necessary for example where the mobile device 1602 or the printer 1616 does not have an active interface, or where secure communications, using such a protocol as HTTPS, may be desired.

As described above, the printer 1616 may also have an assigned E-mail address. The mobile device 1602 may then transmit the information to be printed to the printer 1616 via an email path, designated as S4d in FIG. 16. When the device 1602 is operating in conjunction with redirector software on a host system, the information to be printed may first be sent to a desktop computer or a server computer 1608 through the wireless network 1604 and wireless gateway 1606. The information may then be repackaged by the host system 1608 into an E-mail message or attached to an E-mail message and sent to the E-mail address of the printer 1616. When the E-mail message is received at the printer 1616, the E-mail processor and sequencer module 1510 and the rendering and conversion engine 1512 (FIG. 15) perform any necessary conversion operations and through an appropriate printer driver and printer interface, print the information, as indicated at S5. This E-mail communication path may be preferred, for example, when asynchronous processing is acceptable or desired or where further processing of the information may be necessary.

Although the path S4d between the mobile device 1602 and host system 1608 is shown as bypassing the Internet 1610 and security firewall 1609, those skilled in the art will appreciate that such communications, like any other external communications with the host system 1608, will actually be carried out through the firewall 1609, and unless the gateway is directly connected to the host system 1608, the path S4d will connect to the host system through the Internet 1610. However, it should also be apparent from the description above that communications between a mobile device 1602 and a host system 1608 may be encrypted, which effectively extends the firewall 1609 to the mobile device 1602, such that the path S4d may be considered to be behind the firewall 1609, as shown, in the sense that communications on that path are secure. If the information is of a sensitive or confidential nature, then the host system 1608 may encrypt the E-mail it sends to the printer 1616, using Secure Multipurpose Internet Mail Extensions (S/MIME) or Pretty Good Privacy™ (PGP™) for example. The E-mail processor module 1510 (FIG. 15) would then decrypt the encrypted E-mail from the host system to recover the information to be printed.

Provided that a mechanism for E-mail communication is available between the mobile device 1602 and the printer 1616, then E-mail based printing of information from a mobile device 1602 will be possible. Such an E-mail transfer mechanism may be either indirect, through an intermediate system such as 1608, or more direct, between the mobile device 1602 and the printer 1616 through the wireless network 1604, some sort of gateway 1606 and the Internet 1610. E-mail transfers may also be in the clear or encrypted using PGP for example. However, the information processing management systems and methods of the present invention are in no way restricted to such secure communication arrangements.

When the information to be printed is received by the printer 1616, the printer may print not only the information, but also a separator or cover page, identifying for example an owner of the printed information, the number of pages printed and possibly other information related to the print job or the content printed. Particularly where a printer or its services are used by many users, as is often the case with network printers, multiple print jobs may be in a printer output tray at any time. Such a separator or cover page allows a user to more easily identify and retrieve a printout.

Figure 17:
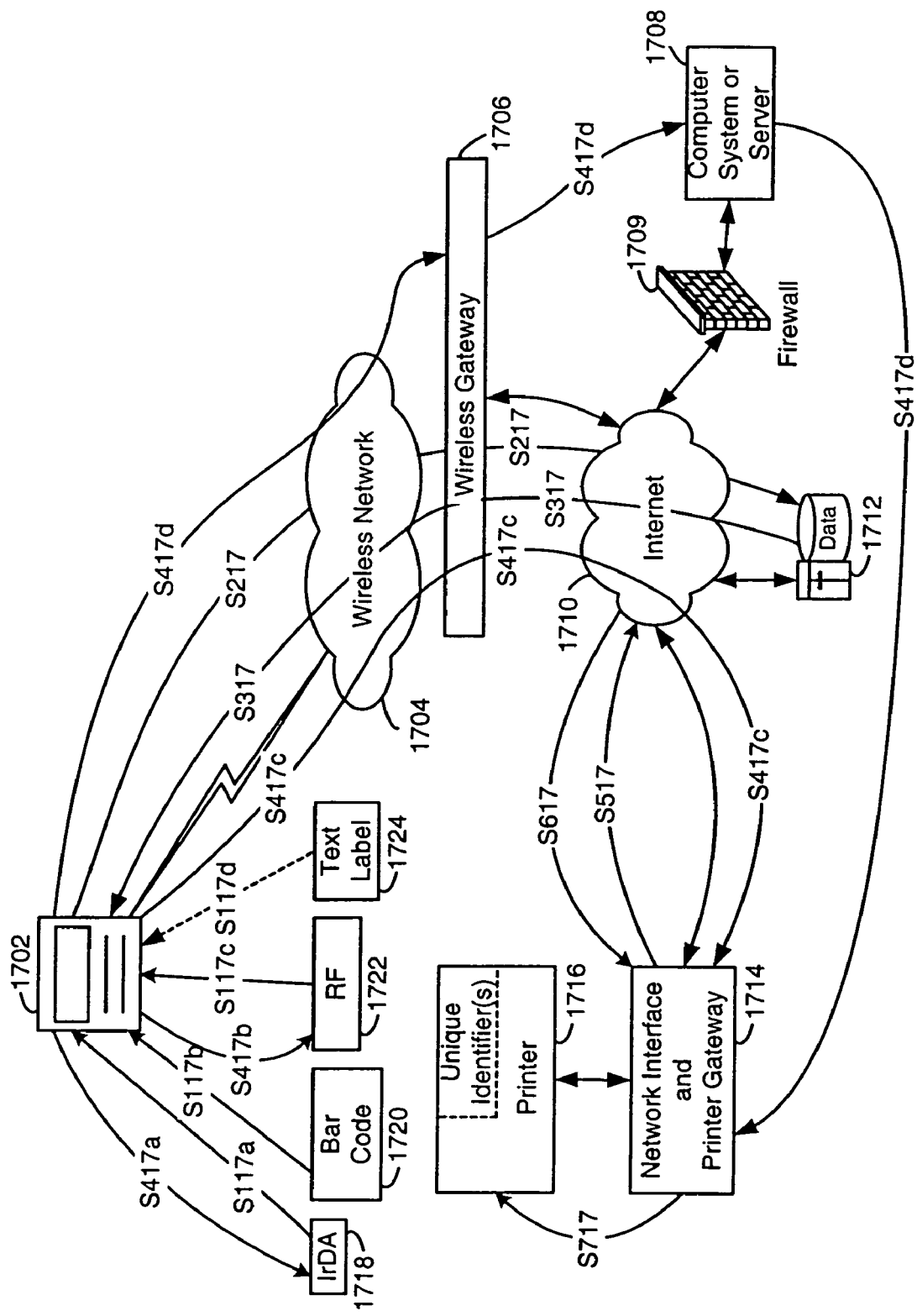
FIG. 17 is a system diagram illustrating a print by reference operation.

FIG. 17 is a system diagram illustrating a print by reference operation. In FIG. 17, the system components 1702, 1704, 1706, 1708, 1709, 1710, 1712, 1714, 1716, 1708, 1720, 1722 and 1724 are substantially the same in structure and operation as the similarly labeled components in FIG. 16. Although the overall structures of the systems in FIGS. 16 and 17 are substantially the same, differences between the print operations illustrated therein will become apparent from the following description.

A print by reference operation begins with a capture of the unique identifier for the printer 1716 or a selected one of its services by the mobile device 1702. As described above, depending upon the capabilities of the mobile device 1702 and the interfaces 1718, 1720, 1722 and 1724 implemented in the printer, the mobile device 1702 may capture an identifier via an IrDA port (S117a), by scanning a bar code (S117b), through an RF interface (S117c) or by a user manually entering (S117d) text label characters on a keyboard or other user interface of the mobile device 1702. Using the unique identifier, a query may then be sent (S217) to the directory 1712, which then responds (S317) with any service information required for the device 1702 to use the printer 1716 or a service provided thereby. Service information may instead be obtained through a UDDI service cloud (not shown). These initial operations are preferably substantially the same as those described above in conjunction with FIG. 16. If all required service information for the selected printer or service has been stored on the mobile device 1702, then the user may access the stored service information, for example through a series of menus as also described above, and thereby avoid the initial operations.

If the mobile device 1702 and printer 1716 are enabled with active interfaces, then a communication signal including a print by reference command or signal, including a reference locator for information to be printed, may be exchanged directly with the printer 1716 through the IrDA port 1718 or RF module 1722, as indicated at S417a and S417b, respectively. A print by reference signal may instead be sent to an IP or URL address of the printer 1716, as indicated at S417c. When E-mail communication or asynchronous processing is desired, then a communication signal containing the reference locator for the information to be printed may be sent to a host system or service 1708, which may then encapsulate the reference locator into an E-mail message or E-mail message attachment, possibly encrypt the E-mail, and forward the E-mail to the printer 1716 or service E-mail address (S417c).

The reference locator for the information to be printed may be an address or other pointer. For example, the reference locator may be a URL that can be accessed by an Internet server (not shown) to provide content, such as product marketing information and the like. The reference locator may also invoke a search of an external information source, identifying for example the information source, a search engine to be used and search parameters to control the search.

The print by reference processor 1512 (FIG. 15) in the network interface and printer gateway 1714 uses the reference locator obtained from the mobile device 1702 through an active interface or a printer or service IP, URL or E-mail address to request the information to be printed from an information source (S517). As described above, the information source may be an Internet service (not shown) which uses the reference locator to retrieve the information to be printed, by accessing a specified Internet location or performing a search for example. The information to be printed, such as web page content or search results, is then returned to the printer gateway 1714 (S617). Like the mobile device 1702 to printer 1716 information transfers, the information retrieval operation between the printer gateway 1714 and an information source such as the Internet 1710 may be based on any common transfer mechanism, including but in no way limited to the above IP, URL or E-mail based communications.

The rendering and conversion engine 1514 (FIG. 15) renders and converts the information returned by the Internet server or other information source. The information is then printed (S717) on the printer 1716 through an appropriate printer driver 1516 and the printer interface 1518 (FIG. 15). The printer may also print a cover or separator page to identify the printout owner, the reference locator used to locate the information to be printed, and possibly other information related to the print job.

Since the information to be printed may be in any of a plurality of formats, including various file types associated with different software application programs or commonly used Internet information formats such as HTML, WML and XML, a plurality of rendering and conversion engines are preferably provided in any information processor. Therefore, printer 1716 may incorporate multiple rendering and conversion engines. The rendering and conversion capabilities of the printer 1716 are preferably registered in the directory 1712, possibly as different services, or as part of service information. A user of a mobile device 1702 is then able to determine whether or not the selected printer 1716 is able to process information of the type to be printed. If necessary, an alternate printer or service may then be selected. For example, the user of device 1702 may send a service type query to the directory 1712 in order to find an information processor supporting the type of service required to perform a desired operation. UDDI-based systems may be especially useful in such circumstances, when a mobile device must find or discover new information processors or services.

Figure 18:
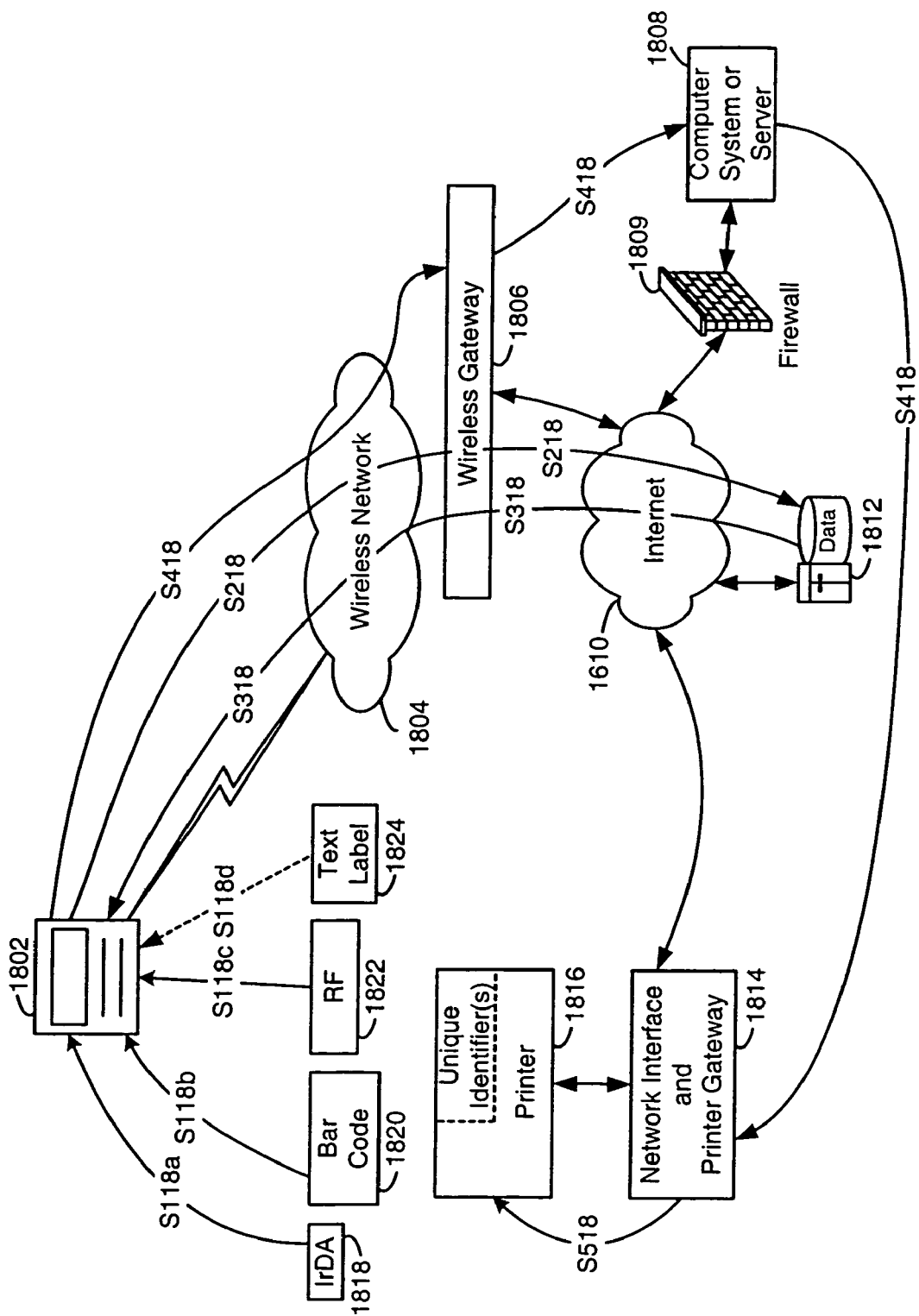
FIG. 18 is a system diagram similar to FIGS. 16 and 17, illustrating a further print operation.

FIG. 18 is a system diagram similar to FIGS. 16 and 17, illustrating a further print operation. The system components shown in FIG. 18 are substantially the same as similarly labeled components in FIGS. 16 and 17.

The print operation illustrated in FIG. 18 involves printing of an E-mail message sent to the printer 1816 from the mobile device 1802. Such a print operation begins with a capture of the unique identifier for the printer 1816 or a selected one of its services by the device 1802, via an IRDA port (S118a), by scanning a bar code (S118b), through an RF interface (S118c) or by a user manually entering (S118d) text label characters into the mobile device 1802. A query may then be sent (S218) to the directory 1812, which responds (S318) with any service information required for the device 1082 to use the printer 1816 or one of its services. Alternatively, a printer or service may be selected from menu or list of printers and services for which all required service information is stored on the mobile device 1802. The service information need then only be retrieved from a store within the mobile device 1802. Service information may also be available to the mobile device 1802 from a UDDI system.

In the example of FIG. 18, the mobile device 1802 forwards a communication signal, in the form of an E-mail message (S418), with or without attachments, to the E-mail address of the printer 1816 or a selected service. The E-mail message may be sent to the printer or service address directly, or through a host or intermediate system 1808. As described above, the E-mail may be sent to the printer 1816 in the clear or encrypted. Encrypted E-mails would then be decrypted by the E-mail processor and sequencer module 1510 (FIG. 15) in the network interface and gateway component 1814.

E-mails received by the SMIP listener 1508 (FIG. 15) in the network interface and printer gateway 1814 are forwarded to the E-mail processor and sequencer 1510, which will separate the E-mail into its different components, as described above, and create multiple print jobs a print job with subcomponents if necessary, for example one for the E-mail message itself and one for each attachment to the E-mail. The information associated with each print job or each print job subcomponent is passed to the rendering and conversion engine 1514, which renders and prints (S518) each job or subcomponent on the printer 1816. In this example, the printed E-mail message may also serve as a cover page or print job separator. However, a distinct cover page or separator page, including addressing, subject and attachment information from the printed E-mail may also be printed for a print E-mail operation, for example when the printed E-mail has a different format than preferred cover or separator pages or perhaps where an E-mail is relatively long, spanning several pages. When the printing operation is completed, the E-mail processor may then create a status E-mail message with the result of the operation and send the E-mail message back to the mobile device 1802. An error message may also be prepared and returned to the mobile device 1802 if an error occurred during processing of a print job.

An E-mail to be printed on the printer 1816 may be composed on the mobile device 1802 by a user, or may instead be and E-mail that was received by the device. Where the device operates in conjunction with a redirection program operating at a host system such as 1808, the E-mail may have been redirected to the mobile device 1802 from the host system 1808. Regardless of the origin of the E-mail message to be printed, the E-mail and any attachments may be sent to and printed on the printer 1816 as described above. In a device with a menu-driven user interface for example, an E-mail function menu may include a "Print" function in addition to such traditional E-mail functions as "Send", "Save", "Forward" and the like. Upon selection of the "print" function and either selection of a previously configured printer or service or configuration of a new printer or service, an E-mail and any associated attachments on the device may be forwarded to and printed on a printer with minimal time and effort on the part of the device user. It is also contemplated that a user of the mobile device 1802 may select one or more particular E-mail message attachments to be printed. For example, if an E-mail message has more than one attachment, a user may wish to print only one attachment with the E-mail. A user may also wish to print only an attachment, without the E-mail message. In either of these cases, a communication signal, such as an E-mail message for example, sent to the printer 1816 may include an indication or identifiers of exactly what should be printed. The gateway 1814 or the printer 1816 would then process the communication signal accordingly.

E-mail message attachments may also be forwarded to an information processor by the host system 1808. In this case, a signal may be sent from the mobile device 1802 to the host system 1808, in response to which the host system 1808 sends the attachment to the information processor, such as the printer 1816.

Figure 19:
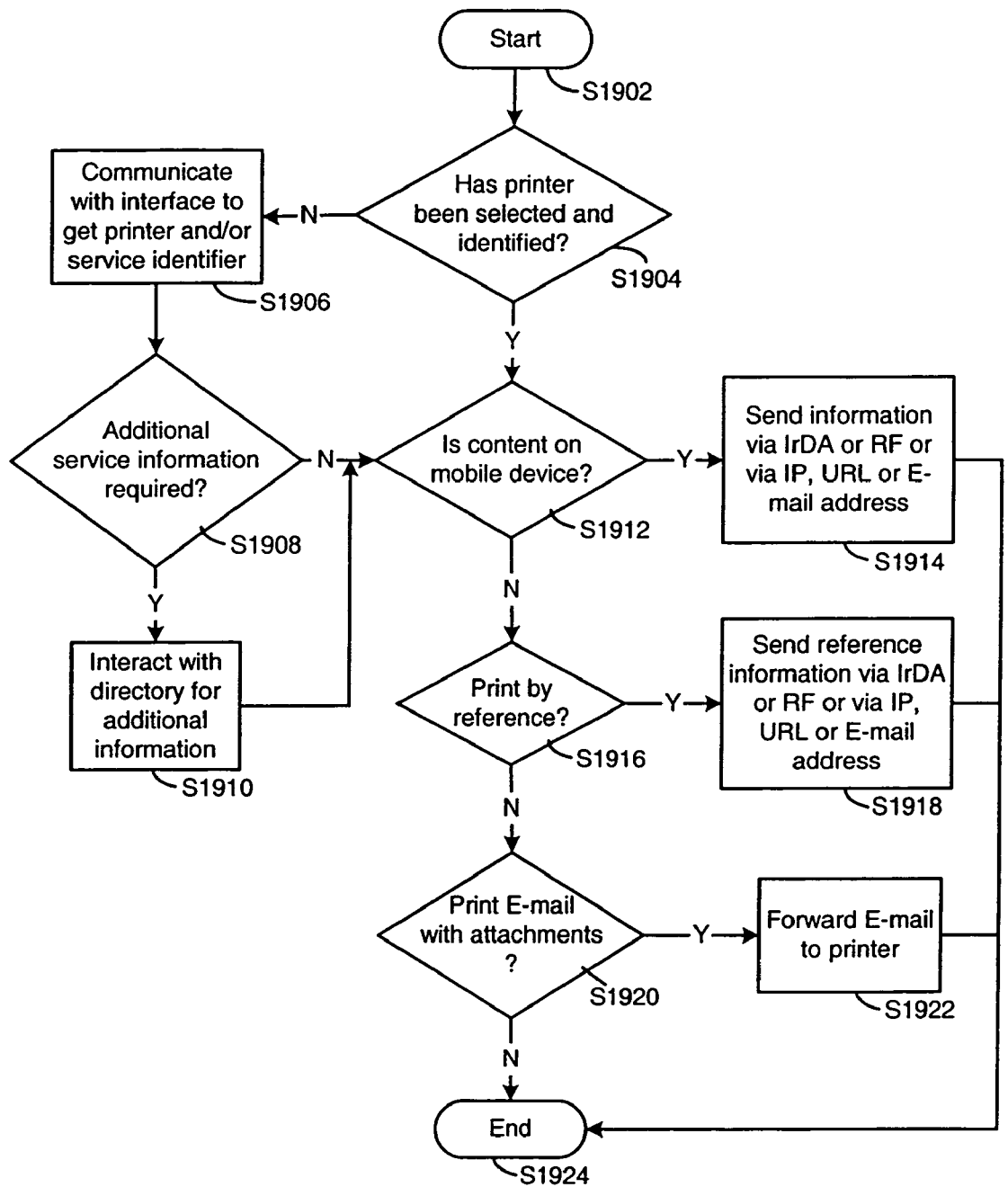
FIG. 19 shows a flow diagram of mobile device operations associated with a printing process incorporating multiple printing functions.

Those skilled in the art will appreciate that a mobile communication device and a printer are preferably enabled for different types of interaction. FIG. 19 shows a flow diagram of mobile device operations associated with a printing process incorporating multiple printing functions. When a print process is invoked on a mobile device at step S1902, a check is performed at step S1904 to determined whether or not a printer or service has been selected and identified, i.e. whether or not the device has all the service information necessary to print information on a selected printer.

If any information, such as the unique identifier for the printer or service, an address for the printer or service or any further service information required for a mobile device-controlled printing operation has not yet been obtained by the mobile device, then the printer or service identifier may first be captured, at step S1906, via one of the interfaces described above. If the mobile device requires still further information as determined at step S1908, where the printer or service identifier is not a routing address for example, the mobile device then queries the directory (S1910) to obtain the required information.

If the mobile device has obtained all service information required to carry out the print operation, either before the print process begins or through steps S1906, S1908 and S1910, print processing continues at step S1912. The mobile device determines if the information to be printed is resident on the mobile device, and if so, a communication signal including the information is sent to the printer (S1914) through an active interface or an IP, URL or E-mail address, as shown in FIG. 16 and described above. If the print operation is a print by reference operation however (S1916), then a communication signal including reference information to be used by the printer gateway to retrieve the content to be printed is sent to the printer (S1918), as described above in conjunction with FIG. 17. A print E-mail operation (S1920) proceeds substantially as described above with reference to FIG. 18, when the E-mail to be printed is forwarded to the printer at step S1922. As described above, an E-mail or attachment may be forwarded to a printer or other information processor by a host system in response to a communication signal sent to the host system from a mobile device. The printing process then ends at step S1924.

Although not explicitly shown in FIG. 19, when information to be printed is sent to the printer or service, the device may then await a response indicating the status or successful completion of a print operation. If no response is received within a predetermined time or the response instead indicates that the printing process could not be completed, then error processing such as a printing retry operation, possibly using a different information transfer mechanism, a different service or a different printer for example, may be executed.

Printer operations in response to transmissions from a mobile device should be apparent from the foregoing description. If the information to be printed is in a message or signal received by the printer, then the information is rendered, converted and printed. For a print by reference command, the information to be printed is first retrieved and then rendered, converted and printed.

Information processing control has been described in detail above in the context of an illustrative example of a printer. Those skilled in the art will appreciate that the operation of other information processors will be similar to printer operations, although the actual information processing operations may be different for other types of information processors. For example, a display device will process and render information in a format suitable for display on a screen or other output interface. An information processor may also be a fax machine which would convert information received from a mobile communication device into a fax-compatible format and send a fax to a destination specified by the device.

Other types of information processors will preferably be configured to perform control operations and provide some sort of return information to a device. For example, a device may receive E-mail attachments or files that it may be unable to process on its own. One or more information processors may be provided with appropriate rendering and conversion engines to effectively translate such attachments or files into formats that can be processed by the device. The translation result would then preferably be returned to the device.

Information processors may also be implemented to provide for remote control functions using a mobile communication device. A control file may be prepared at or received on a mobile communication device and then forwarded to an information processor which interfaces with a controlled system. If the control file is sent to the information processor as an E-mail attachment for example, then an E-mail processor in the information processor preferably separates the attachment from the email message. If necessary, the control file may be compiled or otherwise converted into an appropriate preferably executable format if necessary and executed by the information processor. The operation of the controlled system may thereby be started, stopped or otherwise changed in accordance with instructions in the executable control file. Such an information processor may then return a confirmation message to the device to inform the device user of the status of the control operation. Similarly, new control points or operating parameters may be forwarded to such an information processor and suitably rendered and converted into a control system input format if necessary. Other such configuring and provisioning of remote equipment may also be implemented in conjunction with information processors.

Menus or function lists for a device with menu-driven user interface would preferably be expanded to include additional supported functions associated with information processors. As those skilled in the art will appreciate, different devices may be differently enabled and thus may have different menus. When information processors or services are configured on a device, by storing the required information for a processor in a data store on the device, then submenus for each function are preferably automatically expanded to include the configured processors and services, such that the initial steps of identifier capture and possibly directory querying can be avoided.

Having described in detail several preferred embodiments of the present invention, including preferred methods of operation, it is to be understood that this operation could be carried out with different elements and steps. These preferred embodiments are presented only by way of example and are not meant to limit the scope of the present invention.

What is claimed:

1. A system for accessing services of an information processor with a mobile communication device, comprising:
   a messaging server comprising a redirector program and an attachment handling component stored on a computer-readable medium of the messaging server, wherein the messaging server receives messages having attachments and redirects the messages and information about the attachments to the mobile communication device;
   a firewall coupling the messaging server to a wide area network, wherein the firewall provides security for the messaging server;
   a relay system coupling the wide area network to a wireless network;
   wherein the messaging server encrypts the messages, and redirects the encrypted messages to the mobile communication device through the firewall, the wide area network, the relay system, and the wireless network, the messages remaining encrypted until received at the mobile communication device, which decrypts the encrypted messages;
   a service information provider located remotely from the information processor and the mobile communication device, wherein the service information provider includes service information comprising one or more service addresses associated with the information processor and information regarding the information processing capabilities of the information processor; and
   an interface between the service information provider and the mobile communication device for transferring the service information associated with the information processor to the mobile communication device;
   wherein the mobile communication device obtains the service information associated with the information processor via the interface and wherein each service address enables the mobile communication device to access a particular service of the information processor;
   wherein the mobile communication device determines, based on the information about the attachment and the service information, whether the information processor can process the attachment.

2. The system of claim 1, further comprising an interface between the information processor and the mobile communication device for transferring a unique identifier associated with the information processor to the mobile communication device, wherein the mobile communication device uses the unique identifier to query the service information provider in order to obtain one or more service addresses associated with the information processor.

3. The system of claim 2, wherein the interface between the information processor and the mobile communication device is an active interface.

4. The system of claim 3, wherein the active interface is a wireless interface.

5. The system of claim 4, wherein the wireless interface is an RF interface.

6. The system of claim 5, wherein the RF interface is a Bluetooth interface.

7. The system of claim 5, wherein the RF interface is an 802.11 interface.

8. The system of claim 4, wherein the wireless interface is an infrared interface.

9. The system of claim 3, wherein the active interface enables the mobile communication device to access a particular service of the information processor.

10. The system of claim 2, wherein the interface between the information processor and the mobile communication device is a passive interface.

11. The system of claim 10, wherein the passive interface includes a text label.

12. The system of claim 10, wherein the passive interface includes a bar code.

13. The system of claim 1, wherein the information processor is a printer.

14. The system of claim 13, wherein the printer includes a network interface and printer gateway for coupling the printer to a wide area network.

15. The system of claim 14, wherein the wide area network is the Internet.

16. The system of claim 1, wherein the information processor is one of a plurality of information processors coupled to the Internet.

17. The system of claim 16, further comprising:
   a wireless network in which the mobile communication device is configured to operate; and
   a wireless gateway coupling the wireless network to the Internet;
   wherein the mobile communication device communicates with the plurality of information processors coupled to the Internet via the wireless network and the wireless gateway.

18. The system of claim 16, wherein the one or more service addresses includes a uniform resource locator (URL).

19. The system of claim 1, wherein, if the information processor can process the attachment, then the attachment is sent to the information processor.

20. The system of claim 19, wherein the mobile communication device is configured to send the attachment to the information processor.

21. The system of claim 19, wherein the mobile communication device is configured to send a signal to the host system, and the host system is configured to send the attachment to the information processor in response to the signal.

22. The system of claim 1, further comprising a plurality of interfaces between the information processor and the mobile communication device for transferring a unique identifier associated with the information processor to the mobile communication device.

23. The system of claim 22, wherein at least one of the plurality of interfaces enables the mobile communication device to access a particular service of the information processor.

24. The system of claim 1, further comprising a desktop computer system coupled to the messaging server via a network wherein the mobile communication device shares an account address from which messages are originated with the desktop computer system.

25. The system of claim 24, wherein the account address is an electronic mail account address and the messaging server includes an electronic mail server that stores received messages for the user of the desktop computer system and the mobile communication device in an electronic mailbox associated with the electronic mail account address.

26. The system of claim 1, wherein the one or more service addresses includes an electronic mail address.

27. The system of claim 1, wherein the one or more service addresses includes an IP address.

28. The system of claim 1, wherein:
the service information includes information regarding the type of service associated with each service address;
the mobile communication device is enabled for sending a service type query indicating a type of service to the service information provider; and
the service information provider is configured to provide at least one of a unique identifier and a service address for an information processor or service that supports the type of service indicated in the service type query.

29. The system of claim 1, wherein the information processor device is a printer, fax machine, wired telephone, cellular telephone, video display, or copying machine.

30. The system of claim 1, wherein the mobile communication device is a cellular telephone having data messaging capabilities.

31. The system of claim 1, wherein the mobile communication device is a two-way pager.

32. A method of processing information with an information processor using a mobile communication device, comprising the steps of:
obtaining at the mobile communication device a unique identifier associated with the information processor;
receiving one or more messages at the mobile communication device;
the mobile communication device querying a service information provider using the unique identifier to obtain service information, the service information including at least one service address associated with a service provided by the information processor;
sending a communication signal from the mobile communication device to the information processor using the at least one service address obtained from the service information provider wherein the communication signal comprises the one or more messages;
receiving the communication signal at the information processor; and
performing an information processing operation in response to the communication signal;
wherein the service information further includes information regarding information processing capabilities of the information processor identified by the unique identifier, and further wherein the mobile communication device determines, based upon the information processing capabilities of the information processor, whether the information processor can perform the information processing operation in response to the communication signal;
wherein the step of obtaining a unique identifier is performed using a bar code scanner coupled to the mobile communication device and a bar code label on the information processor;
wherein the results of the information processing operation are stored by the information processor in a computer-readable medium.

33. The method of claim 32, wherein the communication signal includes information to be processed by the information processor.

34. The method of claim 33, wherein the information to be processed comprises an electronic mail message.

35. The method of claim 34, wherein the information to be processed further comprises an attachment.

36. The method of claim 32, wherein the communication signal comprises a processing command to control the information processing operation.

37. The method of claim 36, wherein the communication signal further comprises information to be processed by the information processor.

38. The method of claim 37, wherein:
the communication signal further comprises a reference locator for information to be processed; and
the step of performing a processing operation comprises the step of retrieving the information to be processed using the reference locator.

39. The method of claim 32, wherein the step of obtaining a unique identifier is performed using a wireless communication exchange between the mobile communication device and the information processor.

40. The method of claim 39, wherein the wireless communication exchange is a short-range RF communication exchange.

41. The method of claim 39, wherein the wireless communication exchange is an infrared communication exchange.

42. The method of claim 32, wherein:
the at least one service address is a network address associated with a communication network;
the mobile communication device is configured to send information to and receive information from a wireless communication network; and
the step of sending a communication signal comprises the step of sending the communication signal to the information processor via the wireless communication network and the communication network.

43. The method of claim 42, wherein:
the communication network is the Internet; and
the at least one service address is an IP address or a Uniform Resource Locator (URL).

44. The method of claim 42, wherein the service information provider is coupled to the communication network.

45. The method of claim 32, wherein the unique identifier is a network address of the information processor.

46. The method of claim 45, wherein the service information provider includes one or more service addresses linked to the network address associated with the information processor.

47. The method of claim 32, wherein the querying step comprises the step of transmitting a query from the mobile communication device to the service information provider via a wide area network.

48. The method of claim 47, wherein the wide area network is the Internet.

49. The method of claim 32, wherein the information processing operation comprises a translation operation.

50. The method of claim 49, wherein:
the translation operation translates information into a format that can be processed by the mobile communication device; and
the method further comprises the step of sending translated information from the information processor to the mobile communication device.

51. The method of claim 32, wherein the service information provider associates a plurality of information processors by location.

52. The method of claim 32, wherein the service information provider associates a plurality of information processors by service type.

53. The method of claim 32, wherein the at least one service address is an electronic mail address.

54. The method of claim 32, wherein the information processing operation comprises a printing operation.

55. A method of controlling an information processor using a mobile communication device, comprising the steps of:
- receiving a message having an attachment at a host system;
- transmitting the message and information about the attachment to the mobile communication device;
- obtaining at the mobile communication device a unique identifier associated with the information processor;
- the mobile communication device querying a service information provider using the unique identifier to obtain service information, the service information including at least one service address associated with a service provided by the information processor;
- sending a communication signal from the mobile communication device to the information processor using the at least one service address obtained from the service information provider, wherein the communication signal includes information about the attachment;
- receiving the communication signal and the attachment at the information processor; and
- processing the attachment at the information processor in response to the communication signal;
- wherein the results of processing the attachment are stored by the information processor in a computer-readable medium.

56. The method of claim 55, wherein:
- the method further comprises the step of separating the attachment from the message at the host system;
- the communication signal comprises a reference locator for the attachment; and
- the step of processing the attachment comprises the step of retrieving the attachment from the host system based on the reference locator.

57. The method of claim 55, wherein:
- the method further comprises the step of separating the attachment from the message at the host system; and
- the step of sending a communication signal comprises the steps of:
  - sending a signal to the host system; and
  - sending the attachment from the host system to the information processor in response to the signal.

58. The method of claim 55, wherein the step of sending a communication signal comprises the steps of sending the communication signal from the mobile communication device to the host system and sending the communication signal from the host system to the information processor.

59. The method of claim 55, wherein:
- the step of transmitting the message and information about the attachment to the mobile communication device comprises the step of transmitting the attachment to the mobile communication device; and
- the communication signal comprises the message and the attachment.

60. The method of claim 55, further comprising the step of notifying the mobile communication device that the processing operation has been performed by the information processor.

61. The method of claim 55, further comprising the steps of:
- encrypting the message prior to transmitting it to the mobile communication device; and
- decrypting the message after it is received at the mobile communication device.

62. The method of claim 55, wherein the information about the attachment includes a file name of the attachment.

63. The method of claim 55, wherein the information about the attachment includes a file size of the attachment.

64. The method of claim 55, wherein the information about the attachment includes a file type of the attachment.

65. The method of claim 55, wherein the host system includes an electronic mail server and a plurality of electronic mailboxes, wherein at least one of the electronic mailboxes is associated with the mobile communication device, the method further comprising the steps of:
- storing the message and the attachment at the at least one electronic mailbox associated with the mobile communication device; and
- transmitting the message and the attachment to a desktop computer system coupled to the host system via a local area network.

66. The method of claim 55, wherein the information processor is selected from the group consisting of: a printer, a facsimile machine, a telephone, a copying machine, and a video display.

67. The method of claim 55, wherein the service information provider comprises a Universal Description, Discovery and Integration (UDDI) service cloud.

* * * * *